US012704614B1

(12) United States Patent
Gibson et al.

(10) Patent No.: US 12,704,614 B1
(45) Date of Patent: Aug. 11, 2026

(54) SYSTEM AND METHOD FOR MAINTAINING SONAR IMAGING OF A STRUCTURE REGARDLESS OF MOUNTING PLATFORM MOVEMENT AND ORIENTATION

(71) Applicants: William M. Gibson, Eufaula, AL (US); Justin Freeman, Ball Ground, GA (US); Patrick Snellings, Cumming, GA (US)

(72) Inventors: William M. Gibson, Eufaula, AL (US); Justin Freeman, Ball Ground, GA (US); Patrick Snellings, Cumming, GA (US)

(73) Assignee: Johnson Outdoors Inc., Racine, WI (US)

( * ) Notice: Subject to any disclaimer, the term of this patent is extended or adjusted under 35 U.S.C. 154(b) by 1232 days.

(21) Appl. No.: 17/352,625

(22) Filed: Jun. 21, 2021

Related U.S. Application Data

(60) Provisional application No. 63/044,080, filed on Jun. 25, 2020.

(51) Int. Cl.
*G01S 7/521* (2006.01)
*G01S 15/89* (2006.01)
*G01S 15/96* (2006.01)

(52) U.S. Cl.
CPC .............. *G01S 7/521* (2013.01); *G01S 15/89* (2013.01); *G01S 15/96* (2013.01)

(58) Field of Classification Search
CPC ........... G01S 7/521; G01S 15/89; G01S 15/96
See application file for complete search history.

(56) References Cited

U.S. PATENT DOCUMENTS

| | | | |
|---|---|---|---|
| 4,692,722 | A | 9/1987 | Reichel et al. |
| 5,013,979 | A | 5/1991 | Birleson |
| 5,182,732 | A | 1/1993 | Pichowkin |
| 5,525,081 | A | 6/1996 | Mardesich et al. |
| 5,923,617 | A | 7/1999 | Thompson et al. |

(Continued)

FOREIGN PATENT DOCUMENTS

| | | | |
|---|---|---|---|
| CN | 107140116 | A | 9/2017 |

OTHER PUBLICATIONS

Kenneth G. Foote et al.; Protocols for calibrating multibeam sonar; University of New Hampshire Scholars Repository; https://scholars.unh.edu/ccom; Apr. 2005; 17 pages.

(Continued)

*Primary Examiner* — Isam A Alsomiri
*Assistant Examiner* — Joseph C Fritchman
(74) *Attorney, Agent, or Firm* — Reinhart Boerner Van Deuren P.C.

(57) ABSTRACT

A sonar positioning system and method is provided to position a sonar array, such as a sonar array integrated in a trolling motor propulsion unit housing. The system operates to steer the sonar array once locked on a target or oriented in a desired orientation to counter or compensate for the movement of the trolling motor propulsion unit to allow the sonar array to maintain the orientation or be locked on the target. The system includes a countering mechanism to maintain the external orientation lock of the sonar array despite the movement of the orientation of the structure to which the sonar array is mounted.

21 Claims, 11 Drawing Sheets

(56) References Cited

U.S. PATENT DOCUMENTS

| | | | | |
|---|---|---|---|---|
| 6,254,441 | B1 | 7/2001 | Knight et al. | |
| 6,292,433 | B1 | 9/2001 | Gilbert et al. | |
| 6,431,923 | B1 * | 8/2002 | Knight | B63H 25/42 440/6 |
| 6,661,739 | B1 | 12/2003 | Benjamin et al. | |
| 6,678,210 | B2 | 1/2004 | Rowe | |
| 6,870,794 | B2 | 3/2005 | Healey | |
| 7,606,114 | B2 | 10/2009 | Bachelor et al. | |
| 7,889,600 | B2 | 2/2011 | Thompson et al. | |
| 8,390,300 | B2 | 3/2013 | Ems et al. | |
| 8,463,458 | B2 | 6/2013 | Wood et al. | |
| 8,593,903 | B2 | 11/2013 | Pocwiardowski | |
| 8,606,432 | B1 | 12/2013 | Wood et al. | |
| 8,638,362 | B1 | 1/2014 | Thompson et al. | |
| 8,811,120 | B2 | 8/2014 | Bachelor et al. | |
| RE45,379 | E | 2/2015 | Rowe | |
| 8,964,507 | B2 | 2/2015 | Bachelor et al. | |
| 9,290,256 | B1 * | 3/2016 | Wireman | B63H 20/12 |
| 9,664,783 | B2 | 5/2017 | Brown et al. | |
| 9,766,328 | B2 | 9/2017 | Black et al. | |
| 9,784,825 | B2 | 10/2017 | Brown et al. | |
| 9,784,826 | B2 | 10/2017 | Matson et al. | |
| 9,812,118 | B2 | 11/2017 | Matson et al. | |
| 10,310,062 | B2 | 6/2019 | Coleman et al. | |
| 10,338,195 | B2 | 7/2019 | Stokes et al. | |
| 10,416,307 | B2 | 9/2019 | Stokes et al. | |
| 10,454,398 | B2 | 10/2019 | Hanseler et al. | |
| 10,545,226 | B2 | 1/2020 | Wigh et al. | |
| 10,597,130 | B2 | 3/2020 | Antao et al. | |
| 10,719,077 | B2 | 7/2020 | Clark et al. | |
| 10,852,429 | B2 | 12/2020 | Gatland | |
| 10,890,660 | B2 | 1/2021 | Wigh et al. | |
| 11,173,996 | B2 | 11/2021 | Salmon et al. | |
| 2002/0013106 | A1 * | 1/2002 | Healey | G01S 7/521 440/6 |
| 2003/0223310 | A1 | 12/2003 | Benjamin et al. | |
| 2006/0050615 | A1 | 3/2006 | Swisher | |
| 2007/0173139 | A1 * | 7/2007 | Gierke | G01S 15/96 440/6 |
| 2009/0037040 | A1 | 2/2009 | Salmon et al. | |
| 2013/0215719 | A1 * | 8/2013 | Betts | G01S 15/89 367/88 |
| 2014/0269191 | A1 | 9/2014 | Iverson et al. | |
| 2014/0321242 | A1 | 10/2014 | Acker et al. | |
| 2016/0259055 | A1 | 9/2016 | Betts et al. | |
| 2017/0212230 | A1 | 7/2017 | Wigh et al. | |
| 2018/0100922 | A1 | 4/2018 | Wigh et al. | |
| 2018/0217244 | A1 | 8/2018 | Coleman et al. | |
| 2018/0313953 | A1 * | 11/2018 | Gatland | G01S 15/10 |
| 2019/0064348 | A1 | 2/2019 | Clark et al. | |
| 2019/0072951 | A1 | 3/2019 | Clark et al. | |
| 2019/0179318 | A1 | 6/2019 | Miller et al. | |
| 2019/0242994 | A1 | 8/2019 | Wanis et al. | |
| 2019/0331779 | A1 | 10/2019 | Sandretto | |
| 2020/0049507 | A1 | 2/2020 | Clark et al. | |
| 2020/0072953 | A1 | 3/2020 | Wigh et al. | |
| 2020/0103512 | A1 | 4/2020 | Brown et al. | |
| 2020/0158842 | A1 | 5/2020 | Wigh et al. | |
| 2020/0256967 | A1 | 8/2020 | Wigh et al. | |
| 2020/0292701 | A1 | 9/2020 | Darrow | |
| 2020/0341463 | A1 | 10/2020 | Clark et al. | |
| 2021/0015068 | A1 | 1/2021 | Stoll | |
| 2021/0096244 | A1 | 4/2021 | Wigh et al. | |
| 2021/0263150 | A1 * | 8/2021 | Stokes | G06T 15/08 |
| 2023/0047381 | A1 * | 2/2023 | Vance | B63H 20/007 |

OTHER PUBLICATIONS

Kevin L. Haskins et al.; Interaction between Brash Ice and Boat Propulsion Systems; U.S. Army Corps of Engineers ERDC; https://apps.dtic.mll/sti/citations/ADA596756; Feb. 2014; 95 pages.

Navico Holding AS; Lowrance SpotlightScan Operation Manual; 2014, publicly available prior to Jun. 25, 2020; 12 pages; Lowrance.com.

U.S. Appl. No. 17/217,319, filed Mar. 30, 2021, Clark et al.

* cited by examiner 215 200 212
219 223
231
MOTOR GEAR CLUTCH GEAR
217
221
227
213
210
211
XDCR
225

306 317 319
CONTROLLER MOTOR GEAR
341B
323
341A
MOTOR GEAR
331

SYSTEM AND METHOD FOR MAINTAINING SONAR IMAGING OF A STRUCTURE REGARDLESS OF MOUNTING PLATFORM MOVEMENT AND ORIENTATION

CROSS-REFERENCE TO RELATED PATENT APPLICATIONS

This patent application claims the benefit of U.S. Provisional Patent Application No. 63/044,080, filed Jun. 25, 2020, the entire teachings and disclosure of which are incorporated herein by reference thereto.

FIELD OF THE INVENTION

This invention generally relates to consumer fish finders, and more particularly to control of sonar imaging of underwater structures for use in consumer fish finders.

BACKGROUND OF THE INVENTION

Advances in consumer fish finder sonar technology have yielded significant improvements in fish and underwater structure location and imaging. Indeed, MEGA Imaging® available from Humminbird® of Eufaula, Alabama, takes fish finding into the megahertz range of the sonar signal for more detail than has ever been available before. Pioneered by Humminbird®, the clarity of MEGA Imaging can help an angler easily distinguish fish from structure, see the direction fish are facing and even target individual species. Indeed, with the different types and configurations of equipment, such high quality sonar imaging may provide side imaging, down imaging, 360 degrees around the angler's boat, and real time imaging such as MEGA Live by Humminbird®.

The Side Imaging® products deliver an incredible view to both sides of an angler's boat with extended range out to 200 feet on either side as depicted in FIG. 1. Down Imaging® products are configured to show an angler what is directly below the boat to a depth down to 200 feet in crystal-clear detail as depicted in FIG. 2. Indeed, the demand for these sonar systems is so great that many such systems have been integrated in industry leading Minn Kota® trolling motors, such as the Ultrex shown in FIG. 3. As may be seen, the propulsion unit of the trolling motor is modified to accommodate the sonar transducer(s) within the housing of the propulsion unit.

The 360 Imaging products sweep up to 125 feet in every direction around an angler's boat to deliver the clearest images ever seen of structure, the bottom and fish, even while the boat is sitting still as depicted in FIG. 4. Such technology allows more accurate casts, more unforgettable moments and more incredible MEGA Imaging® all around thanks to the 360-degree view of the water that is constantly updating with the boat at the center.

This product allows an angler to mark a waypoint directly on a Humminbird® screen at the location of a displayed fish, structure, etc., and will then provide range rings to show the distance from the boat to the target. This allows an angler to line up and cast to where the fish are. Indeed, it is possible to customize the sweep area from 360 degrees down to 10 degrees as depicted in FIG. 5. FIGS. 6-8 depict current products available from the assignee of the present application that provide such 360 degree sonar imaging (transducer housing shown in FIG. 6) and can be mounted on a trolling motor (FIG. 7) or stand-alone mounting on the boat (FIG. 8) as desired by the angler.

Real time imaging, such as MEGA Live, provides live or near real time sonar imaging that allows the angler to watch fish and structure in real-time or near real time. The image may be operated in various modes including down, forward and landscape modes that allow the live sonar to be direct downward, outward and around the boat. An angler may be able to view the fish and structure in real-time as well as bait used by the angler such as to see fish move towards or away from structure or the bait used by the angler.

While the above described advances in sonar technology provide the modern angler with the most realistic imaging of the underwater environment, including imaging of the angler's quarry, this sonar technology uses a sonar beam that is relatively small (roughly 25 degrees). As such, the sonar array must be constantly manually steered by the angler to keep it facing at the angler's intended target. Indeed, while the customized sweep area of the 360 Imaging product cuts down on that needed manual steering to keep the intended target in frame on the fish finder display, wind, current, and other forces that move the orientation of the angler's boat soon also require manual steering adjustment to get the target back in frame. Further, automatic steering of the trolling motor during such functions as Spot Lock also varies the orientation of the transducers that are housed within the propulsion unit, even if the orientation of the angler's boat itself remains fixed.

In view of the above, what is needed is a system and method to continually steer the sonar to keep the intended target in frame regardless of movement of the mounting structure of the sonar transducer while fishing and/or to maintain the orientation of the sonar transducer relative to the world or the boat. Embodiments of the present invention provide such systems and methods. These and other advantages of the invention, as well as additional inventive features, will be apparent from the description of the invention provided herein.

BRIEF SUMMARY OF THE INVENTION

In one aspect, embodiments of the present invention provide a system that allow automatic hands and feet free control of the steering of the sonar beam to lock onto an underwater target and continue to keep that target in frame regardless of the movement of the mounting structure of the sonar transducer(s).

In one embodiment the system utilizes one or more of the following Inertial Measurement Unit(s) (IMU) in conjunction with GPS technology, heading sensors, systems or devices used for dead reckoning, a Humminbird Control Head and communication technology, e.g. Ethernet capability, to point the sonar array at an intended target. Preferably, the system will continually steer the array to continue to point towards that target even when the structure to which the sonar array is mounted is rotating or moving in various motions. In one embodiment, the system will control the orientation of the sonar array via an electro-mechanical assembly that can be steered electrically with a servo or other motor. In one embodiment, the system will control the orientation of the sonar array by adjusting the angular coverage of the 360 degree sonar imaging sector scan function available with the 360 Imaging product to adjust for movement of the mounting structure.

In one embodiment, the sonar transducer steering assembly is connected to the fish finder control head via Ethernet. In other embodiments, the communication is accomplished via wireless technology.

In one embodiment, the assembly is pointed towards a target using a foot control. Once the target is in frame, the angler can then push a button to lock on the structure and the system and method will keep the sonar array pointed in the direction of the target regardless of movement of the structure to which the sonar is mounted and changes in orientation or drift regardless of the cause. Such control may be via wired or wireless communication.

In one embodiment, the angler can set a waypoint on the head unit of the fish finder at the structure on which the angler wishes to lock the sonar display. The system will then control the direction and orientation of the sonar array to point at that specific waypoint or waypoints regardless of movement and changes in orientation or drift of the structure to which the sonar transducer array is mounted regardless of the cause. Such system with control the steering of the sonar transducer array at the transducer head in one embodiment similar to the 360 Imaging product or at the control head coupled to the sonar transducer array via a drive tube similar to a trolling motor steering control.

In one embodiment, a target may be tracked using an auto target lock function. In such an embodiment, the sonar return is used to track a target in the water column as it moves around in the sonar return. The system can maintain the sonar array aimed at the moving target. This can be done by using one or more of the following features alone or in conjunction, including steering the sonar array, steering the trolling motor and using, among other things, the trolling motor's current rotation position, the trolling motor's known/fixed offset from the keel or other location of the boat, and the known real-time heading of the boat.

This auto target lock function can find targets within the water and then confirm with a user whether the user wants to track the target that is found. If the user selects to follow the found target, the unit will automatically lock onto the target in the water. The system may then steer the sonar array to maintain the sonar array pointing at the target, even if the target is moving within the real world (e.g. within the water), and/or steer the trolling motor to point and move the boat with or at the target. Thus, not only can the sonar array remain pointed at a moving target, the trolling motor can follow the moving target.

The steering of the sonar array, or other components discussed herein, can be horizontal, vertical or both horizontal and vertical to compensate for relative movement in two or three dimensions. This can also allow for target lock tracking in two dimensions (horizontal or vertical) as well as three dimensions.

In one embodiment, the system operates in conjunction with the trolling motor steering control as it automatically steers the propulsion unit of the trolling motor to position and/or steer the boat around a fishing target or path while steering the transducer to remain locked on its target or in a desired orientation for hands and foot free fishing.

In one embodiment wherein the sonar array is integrated in the trolling motor housing of the propulsion unit, the system operates to steer the sonar array once locked on a target to counter or compensate for the movement of the trolling motor propulsion unit to allow the sonar array to maintain the structure lock. In one embodiment, the system utilizes a countering mechanism to maintain the external orientation lock of the sonar array despite the movement of the internal orientation of the structure to which the sonar array is mounted.

In one embodiment, this countering mechanism is a reverse drive gear that rotates opposite to the main drive gear that controls the orientation of the propulsion unit of the trolling motor. By rotating in the opposite direction from the rotation of the propulsion unit in which the sonar array is mounted, the sonar array is able to maintain a net zero angular movement relative to the angler's boat to which the integrated trolling motor is mounted, regardless of the gross angular rotation of the propulsion unit in both magnitude and direction. Such operation can maintain a fixed orientation of the sonar array relative to the angler's boat to which the integrated trolling motor and sonar are attached while allowing the propulsion unit of the trolling motor to change its orientation relative to the angler's boat.

In one embodiment, a clutch may be employed to allow or prevent such angular compensation between the propulsion unit and the sonar array. When engaged, the reverse drive gear will compensate for rotation of the propulsion unit to maintain a fixed angular position relative to the angler's boat to which the integrated trolling motor is attached, and when disengaged the sonar array will rotate with the rotation of the propulsion unit to maintain a fixed orientation therewith and rotate relative to the angler's boat to which the trolling motor is mounted.

In one embodiment, the countering mechanism is a separate drive motor that may be controlled in coordination with, but opposite rotational direction from, the drive motor of the trolling motor propulsion unit. By driving the sonar array in the opposite direction from the drive motor of the propulsion unit in which the sonar array is mounted, the sonar array is able to maintain a net zero angular movement relative to the angler's boat to which the integrated trolling motor is mounted, regardless of the gross angular rotation of the propulsion unit in both magnitude and direction.

In one embodiment, a switch may be employed to allow or prevent energization of the separate drive motor to provide such angular compensation. When the switch enables energization, the separate drive motor will compensate for rotation of the propulsion unit, and when the switch disables energization, the sonar array will rotate with the rotation of the propulsion unit to maintain a fixed orientation therewith and allow rotation relative to the angler's boat to which the trolling motor is attached.

In one embodiment, the countering mechanism is a separate drive motor that may be controlled independently from the drive motor of the trolling motor propulsion unit. In order to provide independent control of the rotational position of the sonar array while mounted within the propulsion unit, which may be rotating or stationary, the separate drive motor controller senses, detects, or otherwise determines or is provided with the rotational position, rate, and direction of rotation of the propulsion unit. This information is used to fully or partially compensate for such rotation, or to coordinate with such rotation to maintain the same rotational position as the propulsion unit. By driving the sonar array independently from the drive motor of the propulsion unit in which the sonar array is mounted, the sonar array is able to maintain a net zero angular movement relative to the angler's boat to which the integrated trolling motor is mounted, slew at a different rate and/or direction, or maintain a net zero angular movement relative to the propulsion unit regardless of or in association with the gross angular rotation of the propulsion unit in both magnitude, rate, and direction.

In one embodiment, the countering mechanism is a separate drive motor that may be controlled independently from the drive motor of the trolling motor propulsion unit and that receives GPS information. In order to provide independent control of the rotational position of the sonar array while mounted within the propulsion unit, which may be rotating or stationary, the separate drive motor controller senses, detects, or otherwise determines or is provided with the rotational position, rate, and direction of rotation of the propulsion unit.

In order to provide independent control of the rotational position of the sonar array while mounted within the propulsion unit that is mounted to the angler's boat, which may also be rotating or stationary, the separate drive motor controller senses, detects, or otherwise determines or is provided with the rotational position, rate, and direction of rotation of the propulsion unit and the angler's boat. This information is used to fully or partially compensate for such rotation of both, neither, or one of the boat and propulsion unit, or to coordinate with such rotation of both, neither, or one of the boat and propulsion unit to maintain the same rotational position as the propulsion unit, the angler's boat, or the outside world. By driving the sonar array independently from the drive motor of the propulsion unit in which the sonar array is mounted and by knowing the rotation of the boat to which it is mounted, the sonar array is able to maintain a net zero angular movement relative to the outside world, relative to the angler's boat, slew at a different rate and/or direction relative to either or both, or maintain a net zero angular movement relative to the propulsion unit regardless of or in association with the gross angular rotation of the propulsion unit and/or the angler's boat in both magnitude, rate, and direction.

In one embodiment a method of controlling the angular position of the sonar array relative to none, one or a plurality of a movable or fixed object of the outside world, the angler's boat, or the propulsion unit of the trolling motor is provided. Such method allows the angular position of the sonar array to be controlled (a) to face a point fixed relative to at least the x-y axis of the propulsion unit in which the sonar array is mounted (i.e. locked to the angular movement of the propulsion unit), (b) to face a point fixed relative to at least the x-y axis of the boat to which the integrated trolling motor is mounted (i.e. locked to the angular movement of the boat regardless of the angular movement of the propulsion unit), (c) to face to a point fixed relative to at least the x-y axis of the outside world (i.e. locked on a structure on the bottom of the lake regardless of the angular movement of the boat on the lake and regardless of the movement of the propulsion unit of the trolling motor mounted to the boat), or (d) to face a point movable relative to all of the above (i.e. locked on a point regardless of its movement relative to a structure on the bottom of the lake, regardless of the angular movement of the boat on the lake, and regardless of the movement of the propulsion unit of the trolling motor mounted to the boat). The method of (d) allows sonar tracking of, e.g., a point tied to celestial movement, and with IMU input to allow z-axis movement, a swimming fish.

In an embodiment, a sonar positioning system for positioning a sonar array is provided. The system includes a steerable mounting mechanism, a sonar array, and a sonar steering mechanism. The steerable mounting mechanism is steerable about a first axis, which is typically oriented generally parallel to gravity (e.g. plus or minus 10 degrees). The sonar steering mechanism is interposed between the sonar array and the steerable mounting mechanism. The sonar steering mechanism includes a counter steering mechanism configured to counter and/or compensate for movement of the steerable mounting mechanism about the first axis.

In one embodiment, the steerable mounting mechanism is a trolling motor and/or includes a propulsion unit of a trolling motor. The propulsion unit is steerable about the first axis.

In one embodiment, the steerable mounting mechanism includes a steering input that drives a shaft for rotation about the first axis in first and second directions. Typically, this will be used for steering a propulsion unit. The counter steering mechanism is mechanical gearing operably engaged with the steerable mounting mechanism that rotates the sonar array in the first direction when the steering input drives the shaft in the second direction and that rotates the sonar array in the second direction when the steering input drives the shaft in the first direction.

In one embodiment, a clutch is interposed between the mechanical gearing and the steering input. The clutch deactivates the counter steering mechanism in a first configuration such that the sonar array rotates with the shaft in the same direction about the first axis and the clutch activates the counter steering mechanism in a second configuration such that the counter steering mechanism counters and/or compensates for movement of the steerable mounting mechanism about the first axis.

In one embodiment, the steerable mounting mechanism includes a propulsion unit of a trolling motor and a first motor for rotatably steering the propulsion unit about the first axis. Notably, propulsion of the propulsion unit would be generally perpendicular (e.g. plus or minus 10 degrees) to the first axis. The counter steering mechanism includes a second motor for rotatably steering the sonar array relative to the propulsion unit.

In one embodiment, at least one controller is coupled to the first and second motors for driving the first and second motors.

In one embodiment, the at least one controller is configured to drive the second motor in an opposite direction or at a reduced rate as the first motor to counter rotation or limit rotation of the sonar array due to steering of the propulsion unit by the first motor.

In one embodiment, the at least one controller has a lockout mode wherein the at least one controller does not drive the second motor when the first motor is being driven to steer the propulsion unit such that the sonar array is rotated with the propulsion unit when the first motor steers the propulsion unit about the first axis.

In one embodiment, the at least one controller includes a first controller and a second controller. The first controller operably controls the first motor and rotation of the propulsion unit about the first axis and the second controller controls the second motor and rotation of the sonar array relative to the propulsion unit. This rotation of the sonar array may be about the first axis or a second axis offset from the first axis.

In one embodiment, the steering input includes an electric motor operably driving the shaft. In another embodiment, the steering input may be completely mechanical linkages such as belts or pulleys in conjunction with a foot pedal.

In one embodiment, the at least one controller is in the form of a fish finder.

In one embodiment, the at least one controller is configured to maintain the sonar array at a constant orientation relative to the outside world regardless of rotational motion of the steerable mounting mechanism relative to the outside world.

In one embodiment, the system includes an Inertial Measurement Unit (IMU) and/or a GPS unit mountable to a watercraft for measuring movement of the boat relative to the outside world. The controller using information from the IMU and/or GPS unit to control the position of the sonar array relative to the steerable mounting mechanism. In one embodiment, the steerable mounting mechanism could be used also to steer the sonar array relative to the boat or outside world.

In one embodiment, the steerable mounting mechanism includes a mount for mounting to a watercraft. The steerable mounting mechanism is rotatable relative to the mount about the first axis. The sonar steering mechanism rotates the sonar array relative to the steerable mounting mechanism and the mount.

In one embodiment, the counter steering mechanism is configured to rotate the sonar array relative to the propulsion unit at a different rate and/or different direction as the propulsion unit is steered for rotation about the first axis for steering a watercraft.

In an embodiment, a method of using the sonar positioning system is provided. In a particular method, the steerable mounting mechanism is in the form of a trolling motor that includes a propulsion unit. The method includes steering the propulsion unit for rotation about the first axis, such as for steering the watercraft or for Spot Lock functionality. The method includes countering and/or compensating for movement of the propulsion unit by steering the sonar array, using the counter steering mechanism.

In one embodiment, countering and/or compensating for movement of the propulsion unit includes steering the sonar array at a different rate and/or different direction about the first axis or an axis offset from the first axis than the propulsion unit is being rotated about the first axis, with the counter steering mechanism.

In one embodiment, countering and/or compensating for movement of the propulsion unit provides a net zero angular movement of the sonar array relative to a boat to which the sonar positioning system is mounted.

In one embodiment, the method includes deactivating the counter steering mechanism such that steering the propulsion unit changes the angular position of the sonar array in a same direction as the propulsion unit is steered. The method includes changing the orientation of the sonar array relative to a boat to which the sonar positioning system is mounted to a second orientation using the steerable mounting mechanism that steers the propulsion unit. The method includes reactivating the counter steering mechanism. The method includes countering and/or compensating for movement of the propulsion unit by steering the sonar array, using the counter steering mechanism, to maintain the sonar array in this second orientation.

In one method, the method includes steering the sonar array with the sonar steering mechanism while the propulsion unit remains in a fixed orientation relative to a boat to which the sonar positioning system is mounted. This can be used to maintain the sonar oriented in a particular orientation relative to the real world even if the trolling motor remains in a fixed orientation.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

One embodiment of a sonar positioning system 100 and methods of positioning a sonar array utilize an Inertial Measurement Unit(s) (IMU) 102 in conjunction with GPS technology 104, a controller 106, which may be a control head of a fish finder, and Ethernet capability (or other communication protocols) to point a sonar array 110 (also referred to herein as a transducer, transducer array or transducer sonar array) at an intended target or in a desired orientation and then have it continue to point towards that target or in a desired orientation even when the mounting structure for the sonar array 110 is rotating or moving in various motions. Other positioning sensors such as heading sensors and/or systems or devices used for dead reckoning may be employed.

As used herein, a sonar array may include a single transducer that both sends and receives sonar signals, a plurality of transducers that send and receive sonar signals, a single transducer that sends a sonar signal that is then received by a plurality of transducers and/or a plurality of transducers that send sonar signals that are received by a single transducer.

The desired orientation may be relative to, for non-limiting example, a boat to which the sonar array 110 is operably attached, the body of water in which the boat or sonar array 110 is located, a structure, feature or identified object within the body of water, or a particular component of the boat such as a propulsion unit of a trolling motor of the boat.

Figure 9:
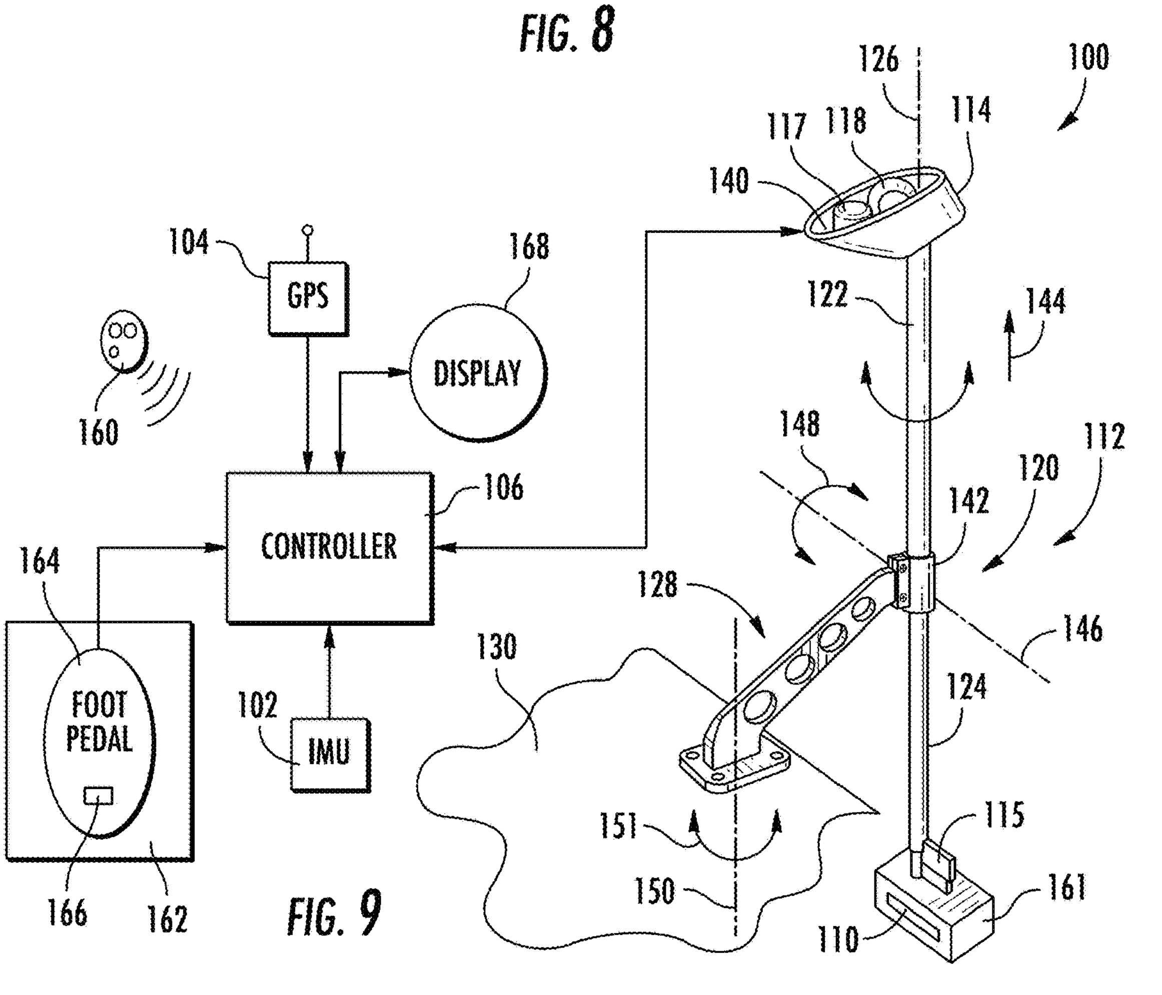
FIG. 9 is a picture of a stand-alone mounting and steering product constructed in accordance with one embodiment of the present invention.

In one embodiment of a sonar positioning system 100, a sonar array 110 is deployed on a steerable mounting mechanism in the form of electro-mechanical assembly 112 that can be steered electrically with a motor and particularly a servomotor contained in a steering housing 114 such as shown in FIG. 9. In particular, the electro-mechanical assembly 112 includes a sonar array mount 115 to which the sonar array 110 is or may be operably attached.

Figure 6:
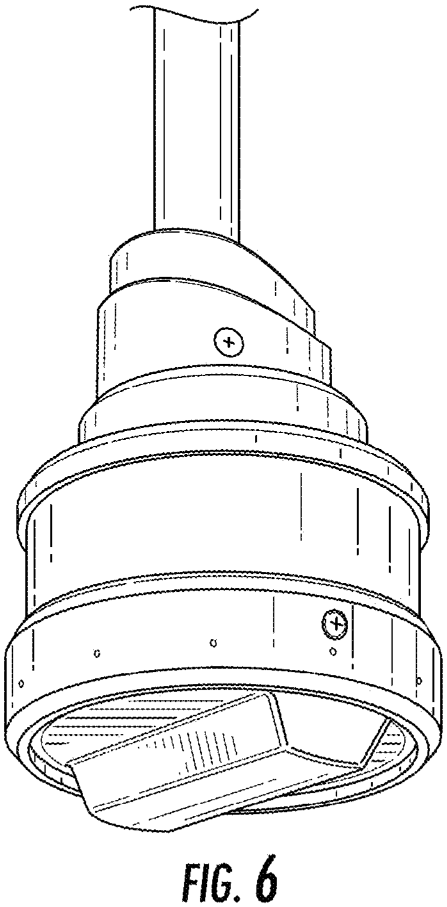
FIG. 6 is a picture of a 360 degree sonar transducer assembly of the system of FIG. 3.
Figure 7:
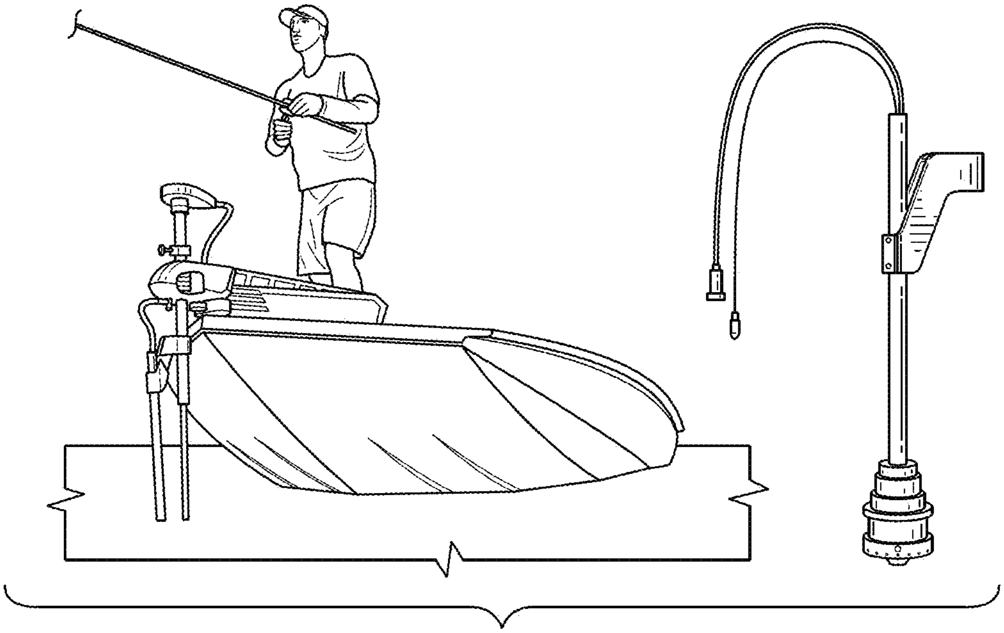
FIG. 7 is a picture of a 360 degree sonar product and installation thereof on an angler's trolling motor.
Figure 8:
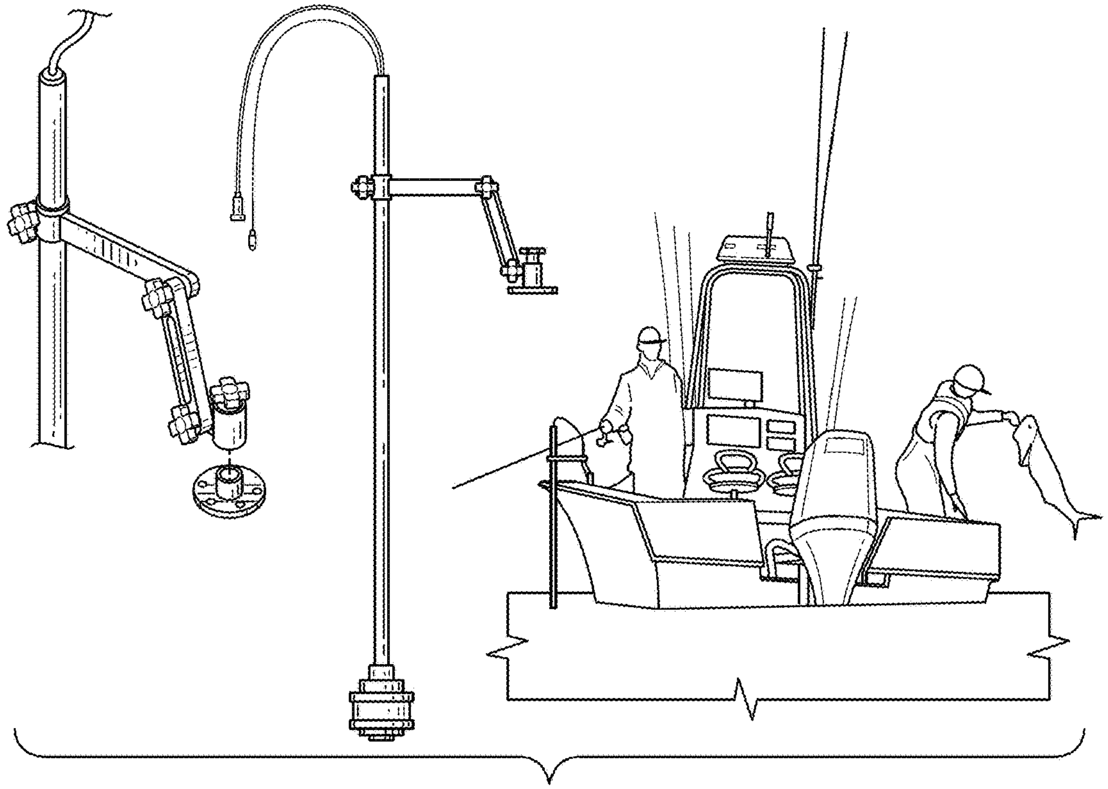
FIG. 8 is a picture of a 360 degree sonar product and installation thereof on an angler's boat.

In an alternative embodiment, the sector scan control of the 360 Imaging product is controlled to adjust its angular direction to accomplish this same structure lock via the transducer housing shown in FIG. 6, whether mounted to a trolling motor, e.g. as shown in FIG. 7, or the transom, deck, gunnel, etc. of the angler's boat, e.g. as shown in FIG. 8. In additional alternative embodiments, the assembly 112 could be fully mechanical in that the device may be steered using pulleys or other belt type systems that would be controlled, for example, by a foot pedal.

The electro-mechanical assembly 112 illustrated in FIG. 9 is connected to a control head 106 of a fish finder or other controller via Ethernet in one embodiment, and via wireless communications technology in other embodiments.

In the embodiment shown in FIG. 9, the steering housing 114, much like a trolling motor, contains the control board 118, cable strain reliefs, and a steering motor 117 driving a double tube system 120. In FIG. 9, a top cover of the steering housing 114 is removed and internal components such as the motor is visible. The double tube system 120 includes a first tube section 122 and a second tube section 124 that is rotatably mounted relative to the first tube section 122 about axis 126. Typically, the second tube section 124 is located within the first tube section 122. In other embodiments, a steering input other than an electronic motor driven system could be used such as a pulley system or other cable drive systems.

The first tube section 122 is attached to a mounting base 128 for mounting the electro-mechanical assembly 112 to a watercraft 130. The first tube section 122 may also be rotatable, such as about axis 126 or another axis, relative to the mounting arrangement 128. However, this rotatability of the first tube section 122 is not required in all embodiments.

As such, in various embodiments, positioning of the sonar array 110 may be affected by rotating either or both of the first and second tube sections 122, 124.

The tube embodiment has a built in latch mechanism, and latches to a molded-in feature on the tub housing on the transducer assembly housing. The transducer tube bracket allows for wire passage while accommodating a rotation mechanism, e.g. motors and wiring.

To aid the angler in raising and lowering the double tube system 120 and sonar array 110 out of and into the water, the steering housing 114 includes a lift handle 140. A rotatable knuckle provides a singular pull action without requiring any knobs. An embodiment includes a depth collar 142 to allow setting the depth of the sonar array 110. To stow the sonar array 110, the angler simply raises the steering housing 114 (illustrated by arrow 144) until it latches in the tube embodiment, then rotates it 90 degrees about axis 146 and illustrated by arrow 148 for stow/transport. The mounting base 128 provides pivotal motion about axis 150, in one embodiment, to allow rotatable adjustment and motion (illustrated by arrow 151) for mounting and stow, allowing it to slide into the boat. The mounting base 128 may also include a means to detach it from the deck/gunwale of the boat, and provides a singular pull-pin action without requiring any knobs.

Figure 10:
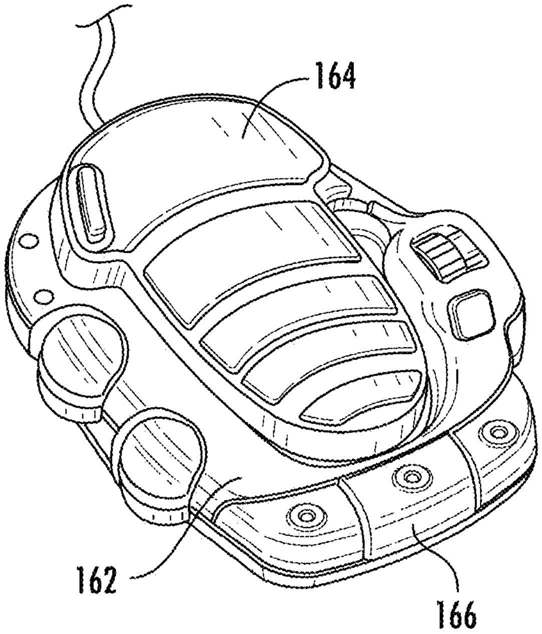
FIG. 10 is a picture of a remote foot control for use with an embodiment of the present invention.

The assembly can be used to point the sonar array 110 towards a target or maintain the sonar array 110 pointing in a particular orientation using multiple different methods/steering mechanisms. In a first method a remote control, such as a handheld remote controller 160, a foot control 162 using a foot pedal 164 such as shown in FIG. 10, a heads up display (HUD) affixed to or integrated with a hat, glasses, etc., is used by the angler to steer the assembly to point the sonar array 110 at the desired target or to maintain the sonar array 110 pointing in a desired orientation.

Once the assembly has been positioned or oriented as desired, the angler may then press a button, give a voice command, make a gesture, etc., on the foot pedal or other remote, telling the system to keep the sonar array 110 pointed in the direction of the target or in the desired orientation. In a second method, a structure lock command is given to the system from the control head 106 of the fish finder via Ethernet or wireless communication, telling the system to keep the sonar array 110 pointed at the target or in the desired orientation. In one embodiment, this is done by setting specific waypoints that may be used similar to Spot Lock and iPilot features currently employed for trolling motor control of the angler's boat via a trolling motor, such as for example via a Minn Kota Ultrex trolling motor.

Embodiments of the present invention provide a system and method that allow an angler to mark a waypoint on an underwater structure i.e. rock, tree, etc, and activate the Structure Lock command, which automatically points the sonar array 110 at this piece of structure regardless of mounting structure movement/direction, drift. In one embodiment, the system and method work in conjunction with the trolling motor as it automatically positions the boat around a fishing target while the sonar array 110 remains locked on its target for hands and foot free fishing.

Figure 11:
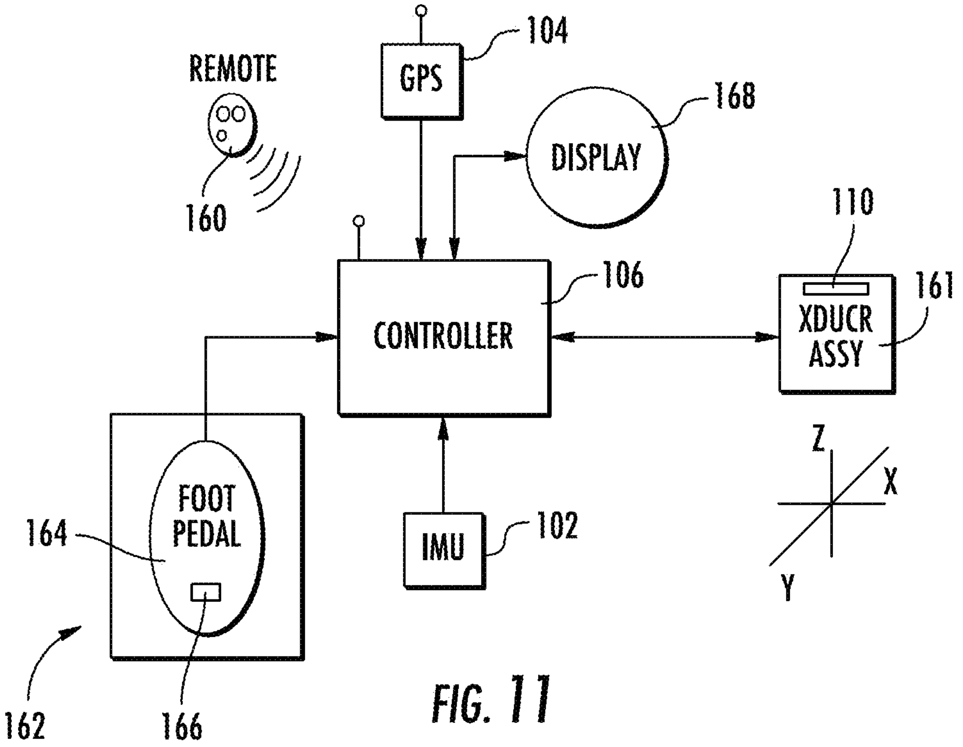
FIG. 11 is a block diagram illustrating elements of an embodiment of the present invention.

Turning now to FIG. 11 there is illustrated a simplified block diagram of one embodiment of the present invention. As may be seen, a controller 106 receives inputs from the IMU 102 and the GPS 104 to control the positioning of the sonar array assembly 161 (Xducr Assy), which includes the servo motors to position the sonar transducer array assembly 161 as well as the sonar array. In one embodiment, the sonar array assembly 161 may be positioned in one dimension. In another embodiment, the sonar array assembly 161 may be positioned in two dimensions. In yet another embodiment, the sonar array assembly 161 may be positioned in three dimensions. While an IMU and GPS is illustrated, other positioning sensors such as heading sensors and/or systems or devices used for dead reckoning may be employed.

As discussed above, the angler may use a foot control 162 including a foot pedal 164 to position the sonar array assembly 161 and aim the associated sonar array 110 at the intended target. Thereafter, the user can press a button 166 to lock the sonar on the desired structure. In another embodiment, a handheld remote controller 160 may be used to position and lock the sonar on an intended target. Still further, the angler may use the display 168 of the fish finder to position and lock the sonar array 110 on the intended target. This may be accomplished by simply touching the display screen to set a waypoint on the structure of interest, and the controller 106 will then continually reposition the sonar array assembly 161 and associated sonar array 110 to keep the structure locked, regardless of the boat 130 orientation, drift, or other movement of the boat 130 due to wind, waves, current, of as a result of steering control as the boat 130 is moved around, toward, or away from the locked structure. As with the sector scanning available with the 360 Imaging, the angular width of the sonar array 110 may be varied as desired to focus on one small area or to broaden the imaging to cover the structure and a wider area on either side thereof.

Figure 1:
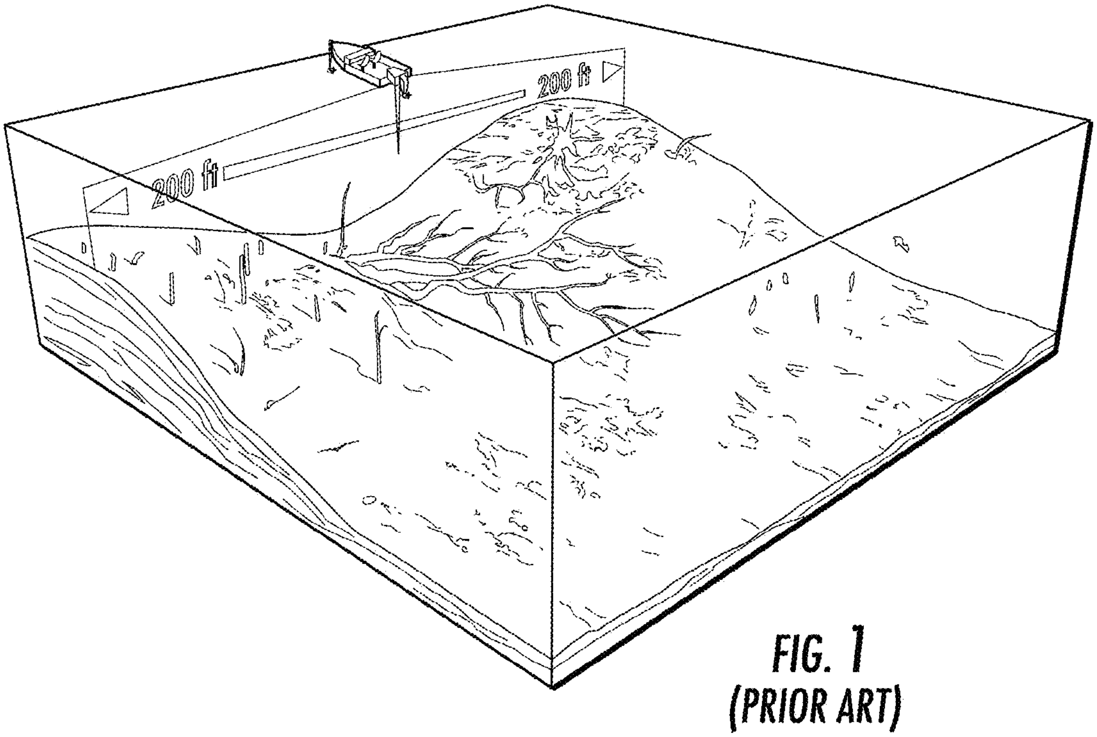
FIG. 1 is a visual depiction of a Side Imaging® sonar system provided by the assignee of the present application.
Figure 2:
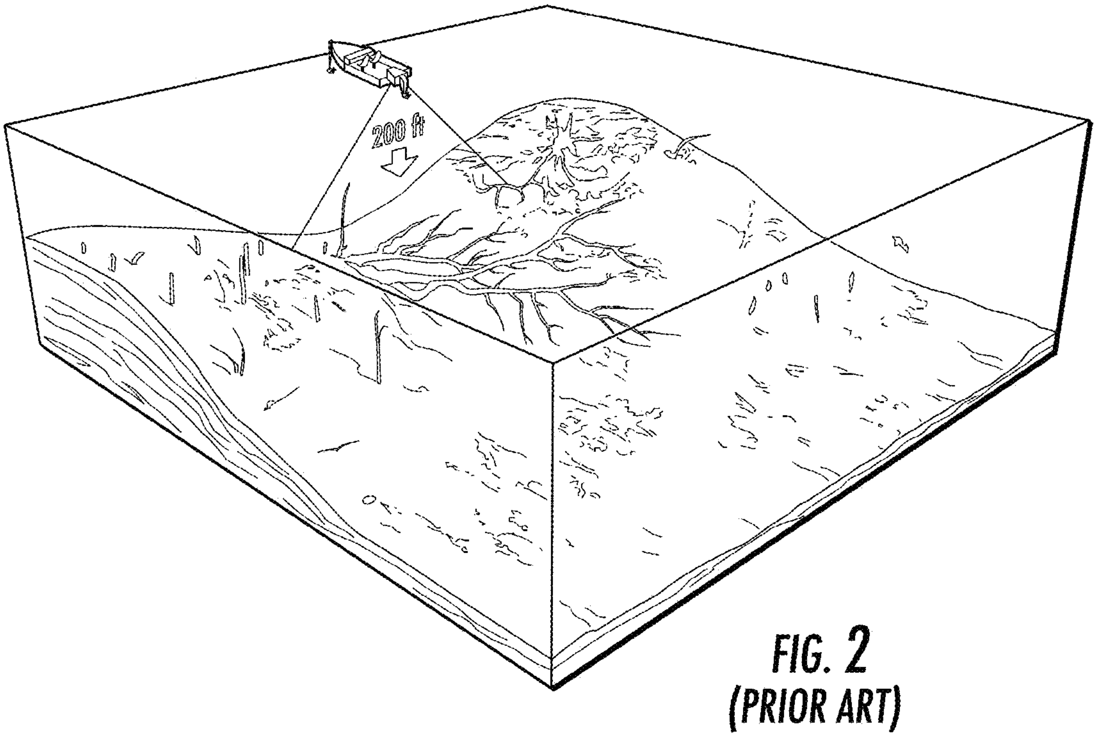
FIG. 2 is a is a visual depiction of a Down Imaging® sonar system provided by the assignee of the present application.
Figure 3:
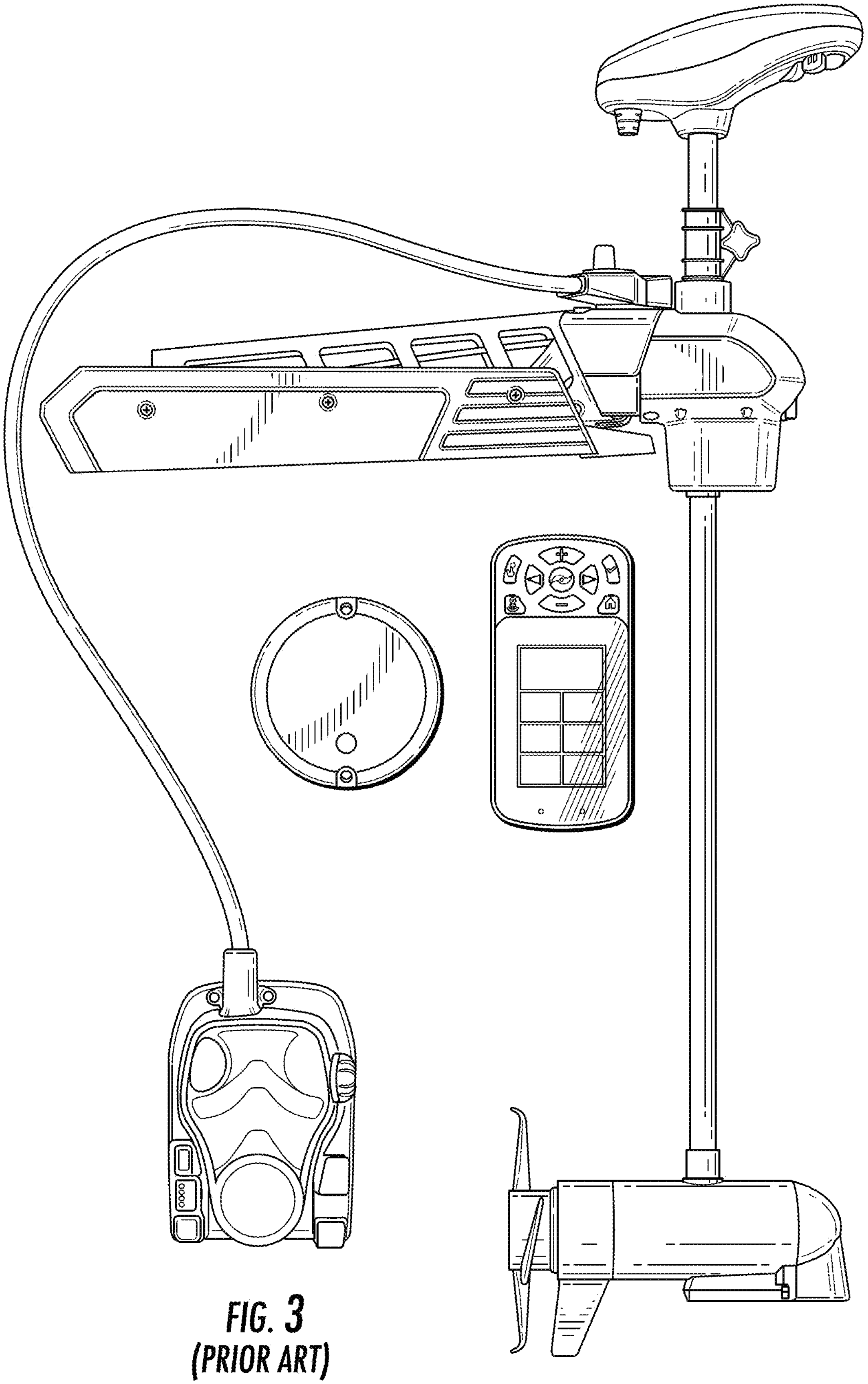
FIG. 3 is a visual depiction of an Ultrex integrated trolling motor and sonar system provide by the assignee of the present application.
Figure 4:
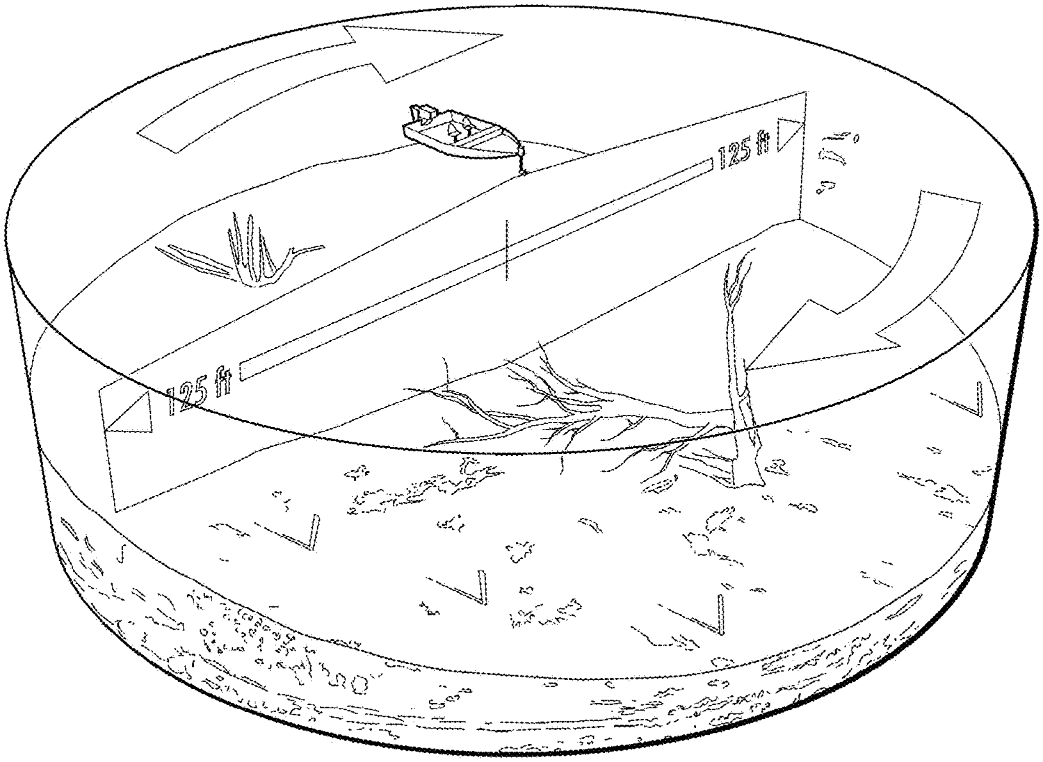
FIG. 4 is a is a visual depiction of a 360 Imaging sonar system provided by the assignee of the present application.
Figure 5:
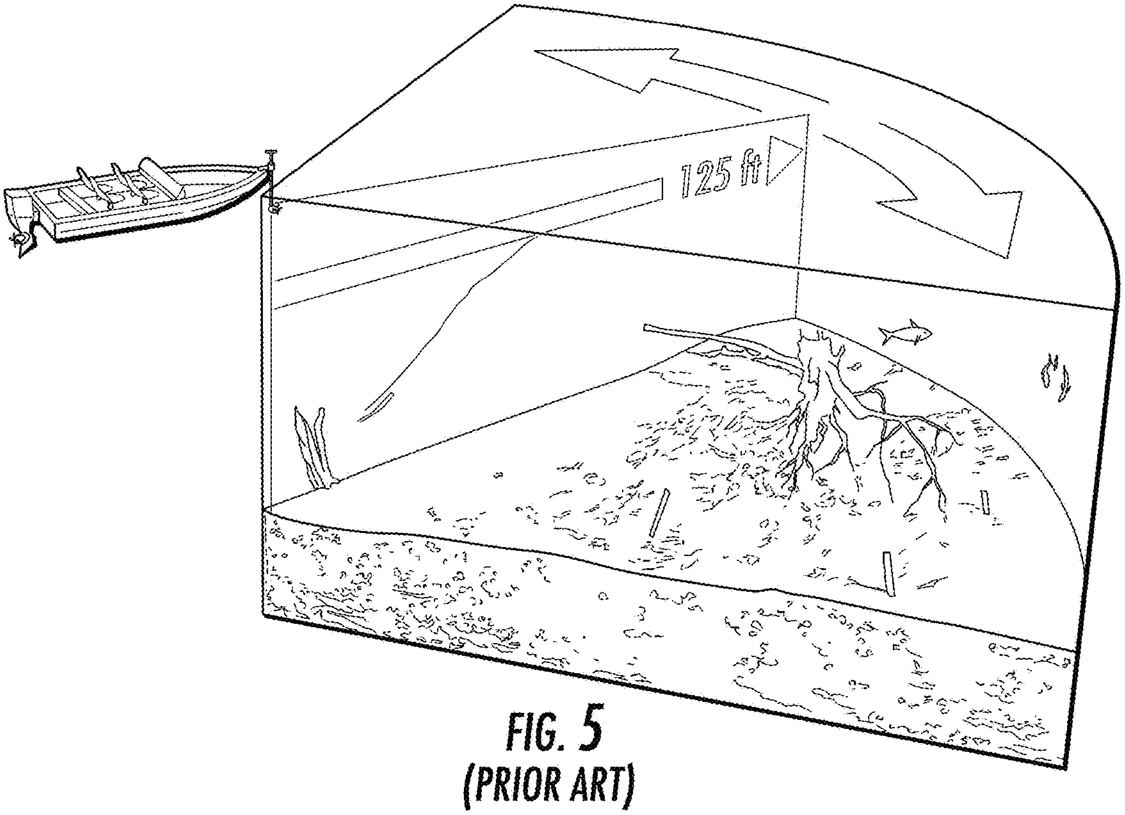
FIG. 5 is a visual depiction of a sector scan feature available with the system of FIG. 3.
Figure 12:
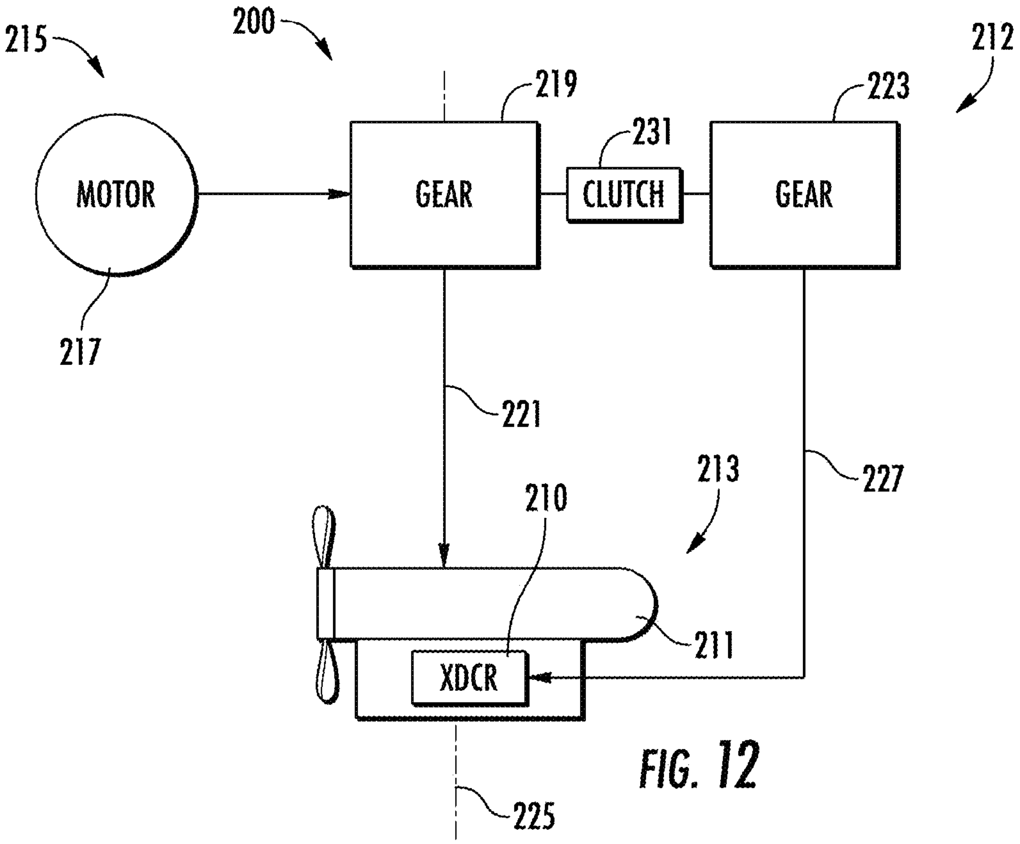
FIG. 12 is a block diagram illustrating a mechanical embodiment of the present invention for use in an integrated trolling motor and sonar array.

In an embodiment, with reference to FIG. 12, the concepts are employed in an integrated trolling motor sonar system such as the Ultrex illustrated above in FIG. 3, where the sonar array 210 is mounted within the housing 211 of the propulsion unit 213 of the trolling motor or otherwise to the trolling motor, such as to the shaft connected to the propulsion unit 213. FIG. 12 illustrates a schematic version of a sonar steering mechanism 200 that includes a counter steering mechanism in the form of a mechanical gearing based compensation system 212. In this embodiment, the steerable mounting mechanism is in the form of the trolling motor in which the sonar array 210 is mounted.

This system 212 allows the sonar array 210 to operate in accordance with the description above despite the fact that the propulsion unit 213 in which it is mounted is itself possibly rotating. As may be seen, and as is recognized by those skilled in the art, the steerable mounting mechanism takes, at least in part, the form of the trolling motor positioning mechanism 215 for the propulsion unit 213. The trolling motor positioning mechanism 215, in this embodiment, includes a motor 217 that operates through a gear train 219 to rotate a tube 221 or other shaft to which the propulsion unit 213 is mounted. Rotation of the tube 221 rotates the propulsion unit 213, such as about axis 225, to provide steering control available to the boat via the trolling motor. While an electric motor 217 is used in FIG. 12, other embodiments could use mechanical steering inputs such as pulleys or other cable drive systems for steering the propulsion unit 213.

In a simplified embodiment that provides counter or compensating capabilities, a counter steering mechanism in the form of a reverse drive gear train 223 operably engaged with the steering input (e.g. motor 217 and/or gear train 219) of the trolling motor may be utilized to counteract or compensate for the rotation of the propulsion unit housing 211 in which the sonar array 210 is mounted. This reverse drive gear train 223 may simply operate to rotate the sonar array 210 to counter the drive control provided by the main steering gear train 219 so as to counteract or compensate for the movement of the housing 211 of the propulsion unit 213 to which the sonar array 210 is mounted. In one embodiment, both the main and reverse gear trains 219, 223 are located in the steering head of the integrated trolling motor. Each operate to drive a separate drive tube of a double tube arrangement. The first tube 221, mentioned above, controls the orientation of the propulsion unit 213 and the second tube 227 controls the orientation of the sonar array 210 within the propulsion unit housing 211. Again, the reverse gear train 223 may be operably engaged with the main steering gear train 219 or motor 217 to provide the counter or compensating movement to the sonar array 210.

In the schematic illustration of FIG. 12, the tubes 221, 227 are illustrated by lines connecting the associated gear trains 219, 223 to the associated propulsion unit housing 211 and sonar array 210. However, in implementation, the first and second tubes 221, 227 may be concentric tubes with one tube located concentrically within the other. Typically, the second tube 227 connected to and operably controlling the orientation of the sonar array 210 would be within the first tube 221 connected to and controlling the propulsion unit housing 211. Here, both tubes 221, 227 would rotate about axis 225. While tubes are described, other shafts could be incorporated.

Such a simplified embodiment may be utilized, for example, to provide a fixed transducer array sonar pattern relative to the mounted position of the trolling motor that merely compensates for the rotation of the trolling motor propulsion unit 213 and particularly the housing 211 during its steering operations. This may be beneficial, for example, to provide fixed forward facing, real time, down scan and/or side scan imaging relative to the mounted orientation of the angler's boat regardless of the positioning of the propulsion unit 213 of the trolling motor.

For example, if the trolling motor and particularly the propulsion unit 213 is oriented with the keel of the angler's boat, but is then steered 10 degrees counter-clockwise, a compensation of the transducer array 10 degrees clockwise will keep the orientation of the sonar array 210 aligned with the keel of the angler's boat. Such compensation, provided by the counter steering mechanism, will allow the sonar array 210 to continue to provide forward facing, real time, Side Imaging and/or Down imaging operation without disruption or regard for the actual orientation of the propulsion unit 213 to which the sonar array 210 is mounted.

As illustrated in FIG. 12, an optional clutch, blocking, or decoupling mechanism 231 may be utilized between the main drive gear train 219 and the reverse drive gear train 223. When engaged, the reverse drive gear train 223 will compensate for rotation of the propulsion unit 213 in order to maintain the fixed angular position relative to the angler's boat as just discussed. When disengaged, however, the sonar array 210 will not be compensated for rotation of the propulsion unit 213 to which it is mounted. Instead, the sonar array 210 will rotate with the rotation of the propulsion unit 213. This allows the sonar array 210 to maintain a fixed orientation relative to the propulsion unit 213 of the trolling motor that will vary relative to the orientation of the angler's boat as the trolling motor performs its steering function.

Indeed, such operation allows the angler to position the trolling motor's propulsion unit 213 via the trolling motor's steering system simply for the benefit of reorienting the sonar array 210 utilizing the known steering controls for the trolling motor itself. If the angler then wishes to lock the sonar array 210 on a particular target or in a particular orientation relative to the boat, the clutch 231 may then be reengaged in order to maintain that relative orientation of the sonar array 210 regardless of further rotation of the trolling motor's propulsion unit 213 and particularly housing 211. Such a configuration allows free operation to provide the steering, Spot Lock, or other functions available therethrough without changing orientation of the sonar array 210.

In other embodiments, the second gear train 223 may be located within the housing 211 of the propulsion unit 213.

Figure 13:
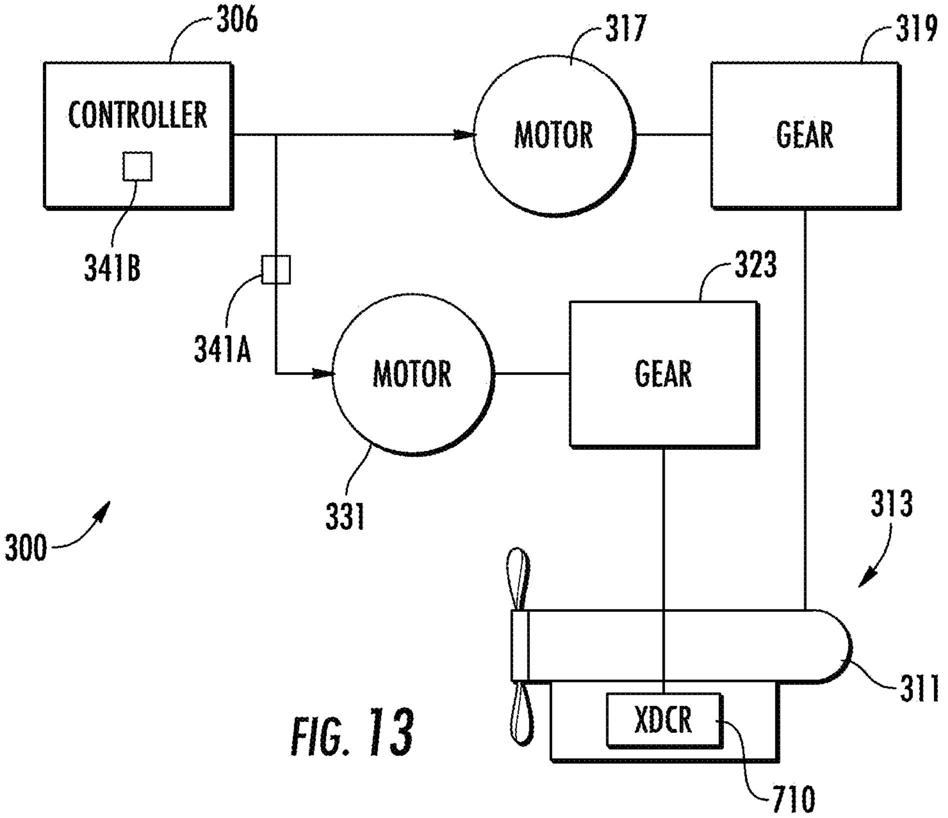
FIG. 13 is a block diagram illustrating a dual motor embodiment of the present invention for use in an integrated trolling motor and sonar array.

With reference to FIG. 13, an embodiment of a sonar positioning system 300 of the present invention utilizes two motors 317, 331 and possibly respective gear trains 319, 323 sized appropriately for the mechanical load of the propulsion unit 313 and the sonar array 310 in order to provide the compensation and control of the angular position of the sonar array 310. In one embodiment, and while not physically depicted in the schematic illustration of FIG. 13, the motor 331 and gear train 323 that positions the sonar array 310 may be positioned within the propulsion unit housing 311 and be connected to the controller 306 via a wired connection. Alternatively, the motor 331 and gear train 323 for the sonar array 310 may be located in the steering head of the trolling motor and connected to the sonar array 310 via a drive tube as discussed above.

As illustrated, the motor 331 for the sonar array 310, which is a counter steering mechanism, operates opposite to or at a different angular rate relative to the motor 317 that drives the propulsion unit 313 to provide the steering function. In other words, the motor controller 306 can control in coordination with, but in opposite rotational direction from the drive motor 317 of the trolling motor propulsion unit 313. By driving the sonar array 310 in the opposite direction or at a different rate as the propulsion unit 313, the sonar array 310 is again able to maintain a net zero angular movement relative to the angler's boat to which the integrated trolling motor is mounted regardless of the gross angular rotation of the propulsion unit 310 in both magnitude and direction. In this instance, the trolling motor is again a steerable mounting mechanism.

An electrical switch, which may be a separate mechanical switch 341A or a component 341B of controller 306, may be employed to allow or prevent energization of the second drive motor 331 to provide such angular compensation. As with the clutch 231 in the above-described embodiment, when the switch 341A, 341B enables energization of the motor 331 for the sonar array 310, the separate drive motor 331 will compensate for rotation of the propulsion unit 313, and when the switch 341A, 341B disables energization, the sonar array 310 will rotate with the rotation of the propulsion unit 313 to maintain a fixed orientation therewith. As with the above embodiment, disabling the separate drive motor 331 allows the standard trolling motor steering operation to position the sonar array 310 utilizing the typical steering control functions available for the trolling motor itself. Thereafter, the switch 341A, 341B can enable energization of the motor 331 to provide the rotational compensation to enable fixed orientation with the Angler's boat or the world, e.g. to continue to lock on the structure at which it was directed or in the desired orientation.

Notably, controller 306 may take the form of a separate controller independent of a fish finder or could be incorporated into a fish finder.

Figure 14:
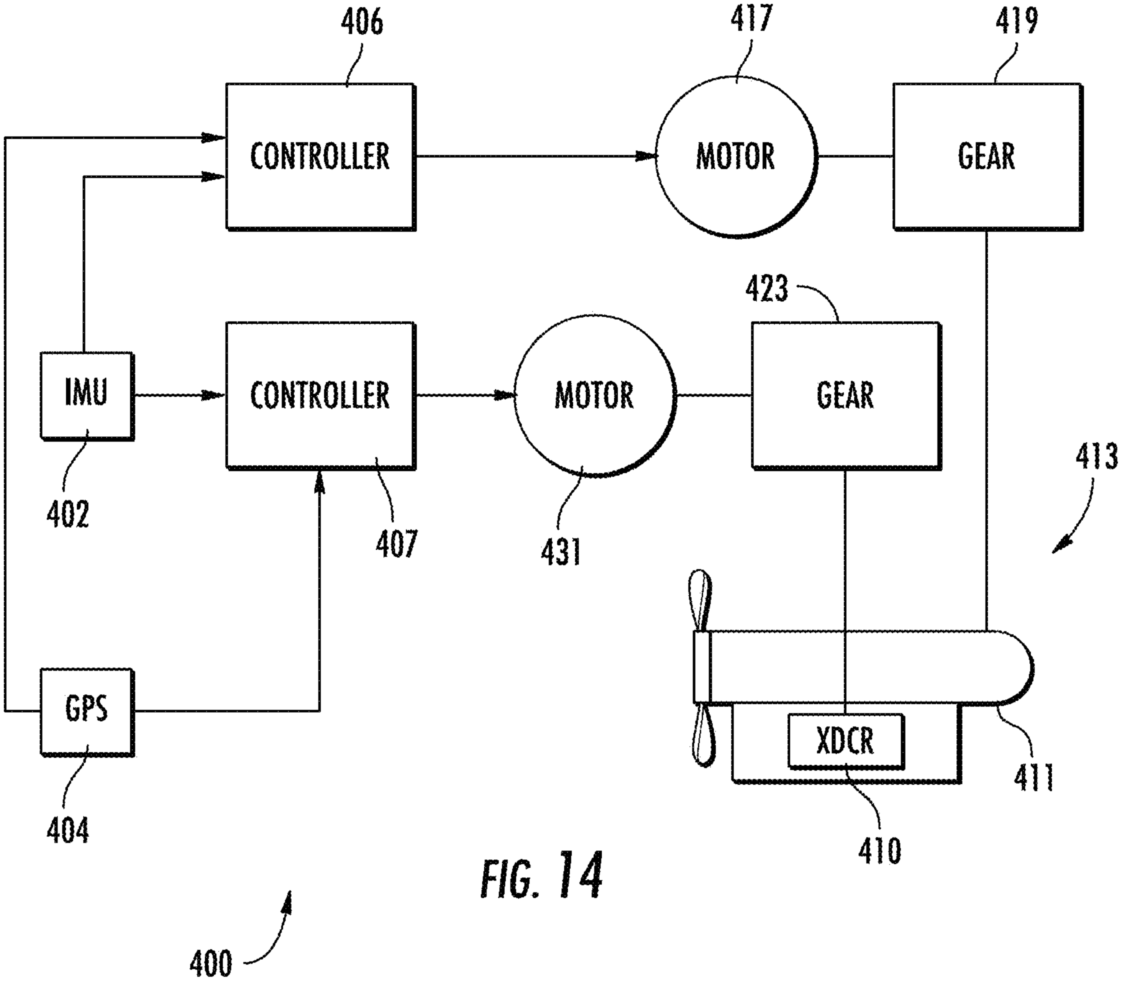
FIG. 14 is a block diagram illustrating a dual electronic controller embodiment of the present invention for use in an integrated trolling motor and sonar array.

As illustrated in FIG. 14, a further sonar positioning system 400 is provided. In this embodiment, the positioning of the sonar array 410 may be accomplished via its own controller 407 (or control logic), motor 431, and gear train 423. In this embodiment, the controller 407, motor 431 and gear train 423 form a sonar steering mechanism and include the counter steering mechanism. Components of this embodiment may be housed in the steering head of the trolling motor, in the propulsion unit 413, or a combination of both with appropriate electrical or mechanical coupling being provided. Further yet, the controller 407 could be incorporated into a fish finder as well as controller 406.

In this embodiment, the countering mechanism for rotation of the propulsion unit housing 413 in which the transducer sonar array is mounted enables independent control from the drive motor 417 of the trolling motor itself. In order to provide such independent control of the rotational position of the sonar array 410 mounted within the propulsion unit 413 of the integrated trolling motor or otherwise to the trolling motor, which may be rotating or stationary, the separate drive motor controller 407 senses, detects, or otherwise determines or is provided with the rotational position, rate, and direction of rotation of the propulsion unit 413 that is under the control of its own controller 406, motor 417, and appropriate gear train 419, its own independent steerable system.

This information is used by the controller 407 for the sonar array 410 to fully or partially compensate for such rotation of the propulsion unit 413 to which it is mounted, or to coordinate with such rotation to maintain the same rotational position as the propulsion unit 413 to provide operation similar to the disengaged clutch or de-energized motor of the proceeding two embodiments. That is, the controller 407 for the sonar array 410 actively controls the position thereof within the propulsion unit housing 411 to track its rotational position as if it were locked in position and not being actively controlled. This allows the sonar array 410 to maintain a net zero angular movement relative to the angler's boat to which the integrated trolling motor is mounted, slew at a different rate and/or direction, or maintain a net zero angular movement relative to the propulsion unit 413 in which it is mounted regardless of or in association with the gross angular rotation of the propulsion unit 413 in both magnitude, rate, and direction.

This arrangement can find particular use if the propulsion unit 413 and the sonar array 410 are rotatable about axes that are not co-linear. The independent control of the positioning of the sonar array 410 allows for more precise and finer positioning adjustment of the sonar array 410 due to changes of position of the array relative to the world, the boat, or the propulsion unit 413. This arrangement may be useful when the sonar array 410 is a separate add on feature that is added to a trolling motor and when the sonar array 410 is not directly mounted within the propulsion unit 413. For example, the sonar array 410 may be mounted to a shaft of the trolling motor that is connected to the propulsion unit 413.

While not specifically illustrated in FIG. 14, this embodiment may also utilize GPS information 404 and/or IMU information 402 to control positioning of the sonar array 410 in addition to the rotational position information of the propulsion unit 413 in which it is mounted. With this additional information, additional modes of operation are available. That is, in order to provide independent control of the rotational position of the sonar array 410 while mounted within the propulsion unit, which may be rotating or stationary, the separate drive motor controller senses, detects, or otherwise determines or is provided with rotational position, rate, and direction of rotation of the propulsion unit 413 as discussed above.

However, in order to provide independent control of the rotational position of the sonar array 410 which is mounted within the propulsion unit 413 that is mounted to the angler's boat, which may also be rotating or stationary, the separate drive motor controller 407 senses, detects, or otherwise determines or is provided with the rotational position, rate, and direction of rotation of the propulsion unit 413 and/or of the angler's boat. This information is then used to fully or partially compensate for such rotation of both the boat and the propulsion unit 413, neither of these, or one of the boat or the propulsion unit 413. Such information may also be used to fully or partially coordinate with such rotation of both, neither, or one of the boat and propulsion unit 413 to maintain the same rotational position as the propulsion unit 413, as the angler's boat, or as the outside world.

Such an embodiment that drives the drive motor 431 of the sonar array 410 independently from the drive motor 417 of the propulsion unit 413 in which the sonar array 410 is mounted and by knowing the rotation of the boat to which the integrated trolling motor is mounted, the sonar array 410 is able to maintain a net zero angular movement relative to the outside world, relative to the angler's boat, relative to the propulsion unit, slew at a different rate and/or direction relative to any one or a combination of these, or maintain a net zero angular movement relative to the propulsion unit 413 regardless of or in association with the gross angular rotation of the propulsion unit 413 and/or the angler's boat in both magnitude, rate, and direction.

Figure 15:
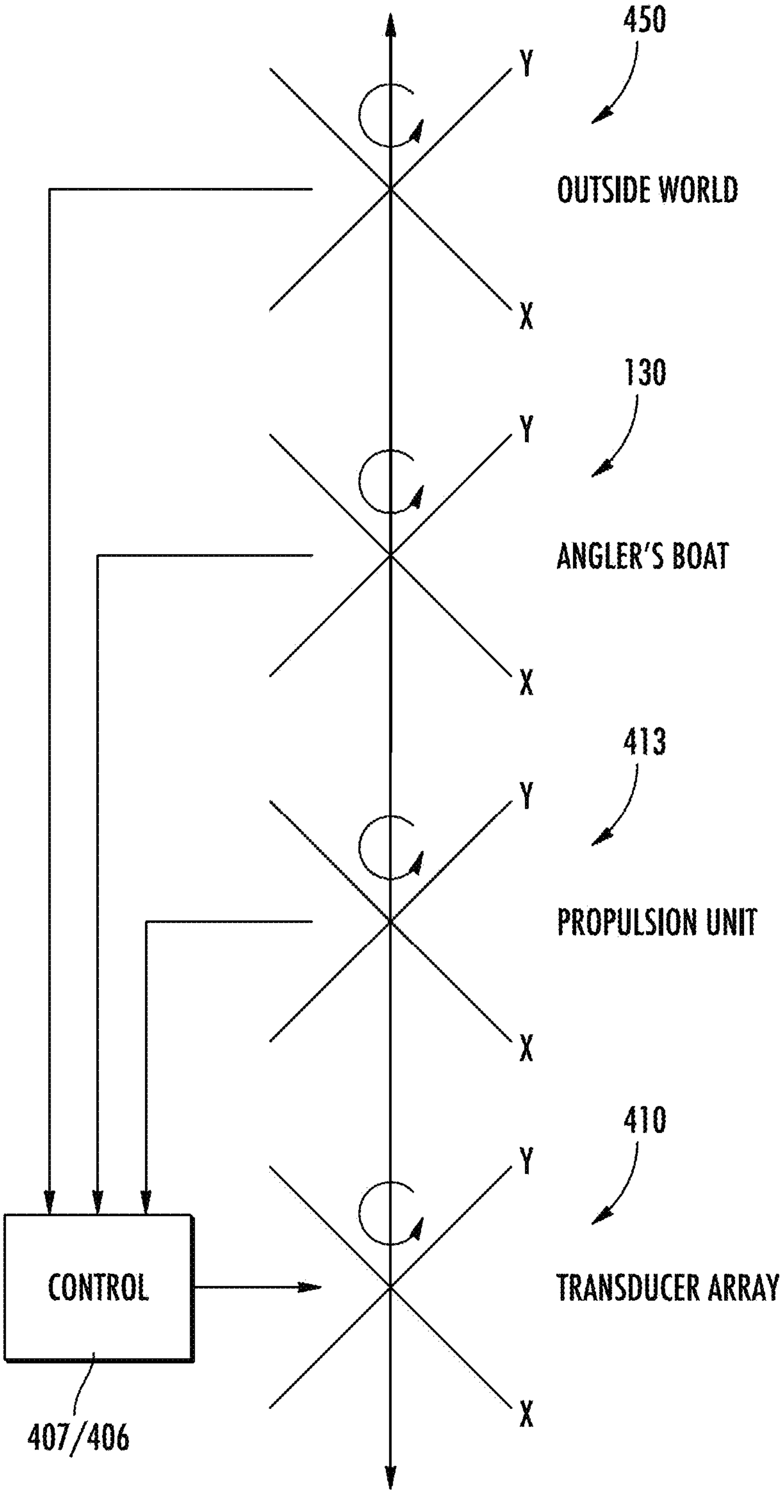
FIG. 15 is a reference coordinate illustration used in embodiments of the present invention.

Such operation and control method may be better understood with reference to FIG. 15. This figure illustrates various coordinate base systems in which relative movement is possible and for which compensation control of the sonar array 410 may be provided. As shown, input from the rotation of the propulsion unit 413 along its X-Y-coordinate system is provided to the sonar array controller 407. This information may be used to provide rotational control within the coordinate system of the sonar array 410 in view of the fact that the sonar array 410 is mounted to the propulsion unit 413 which may rotate in its coordinate system, and which would therefore affect the rotational position of the sonar 410 array itself within its coordinate system.

For this same reason and to provide compensation therefore, information from the rotational position of the angler's boat 130 in its coordinate system is also provided to the sonar array controller 407. This information may then be used to allow compensation for movement of the angler's boat due to wind, current, drift, or other factors that cause the rotational position of the boat itself to move. As will be understood, movement of the boat 130 in its coordinates system will also result in rotation of the propulsion unit 413 because it is mounted to the boat 130, which will affect the rotational position of the sonar array 410, which is mounted to the propulsion unit 413.

As also illustrated in FIG. 15, information with regard to the coordinate system of the outside world 450 is also provided to the controller 407 for the rotational position of the sonar array 410. This information may be used to allow for compensation of movement within that coordinate system 450 as will be discussed more fully below. Indeed, the controller 407 for the sonar array 410 may take into consideration multiple different coordinate systems in order to compensate for movement therein that may affect the position of the sonar array 410 and for which compensation is desired.

Utilizing the information of relative positioning in the various coordinate systems as discussed above, an embodiment of the control method for controlling the angular position of the sonar transducer array may adjust the sonar array 410 relative to none, one, or a plurality of movable or fixed objects of the outside world (e.g. underwater targets), of the angler's boat 130, or of the propulsion unit 413 of the trolling motor.

Such a control method allows the angular position of the sonar array 410 to be controlled in order to face a point fixed relative to the X-Y axis of the propulsion unit 413 coordinate system in which the sonar array 410 is mounted. This would enable, for example, locking the angular position of the sonar array to the angular movement of the propulsion unit 413 to allow the trolling motor steering control to position the sonar array 410.

Such control method also allows the sonar array 410 to be positioned to face a point fixed relative to the X-Y coordinate system of the angler's boat 103 to which the integrated trolling motor is mounted. Such operation allows the position of the sonar array 410 to be locked to the angular movement of the boat 130 regardless of the angular movement of the propulsion unit 413 in which it is mounted. This may allow, for example, a forward-looking, real time, down scan, or side imaging operation that is fixed to the orientation of the boat regardless of its orientation within the coordinate system of the outside world and the rotational movement of the propulsion unit 413 of the trolling motor to provide the steering or Spot Lock functionality.

This control method also allows the sonar array 410 to be positioned to face a point fixed relative to the X-Y coordinate system 450 of the outside world. This would allow operation of the structure lock function described above wherein the sonar array 410 is locked on a structure within a body of water regardless of the angular movement of the boat 130 on the surface of the body of water and regardless of the movement of the propulsion unit 413 of the integrated trolling motor mounted to the boat 130.

This control method also allows operation to position the transducer array to face a point movable relative to all of the above. That is, it allows for controlling the angular position of the sonar array 410 to lock onto a point regardless of its movement relative to a structure within a body of water, regardless of the angular movement of the boat on the surface of the body of water, and regardless of the movement of the propulsion unit 413 of the trolling motor mounted to the boat 130 that is providing the steering or spot lock functionality. This operating mode allows the sonar array 410 to track, for example, a point tied to a celestial movement, or with appropriate IMU input discussed above and additional mechanism to allow Z-axis movement of the sonar array 410, to track a swimming fish in all three dimensions within the body of water itself.

Figure 16:
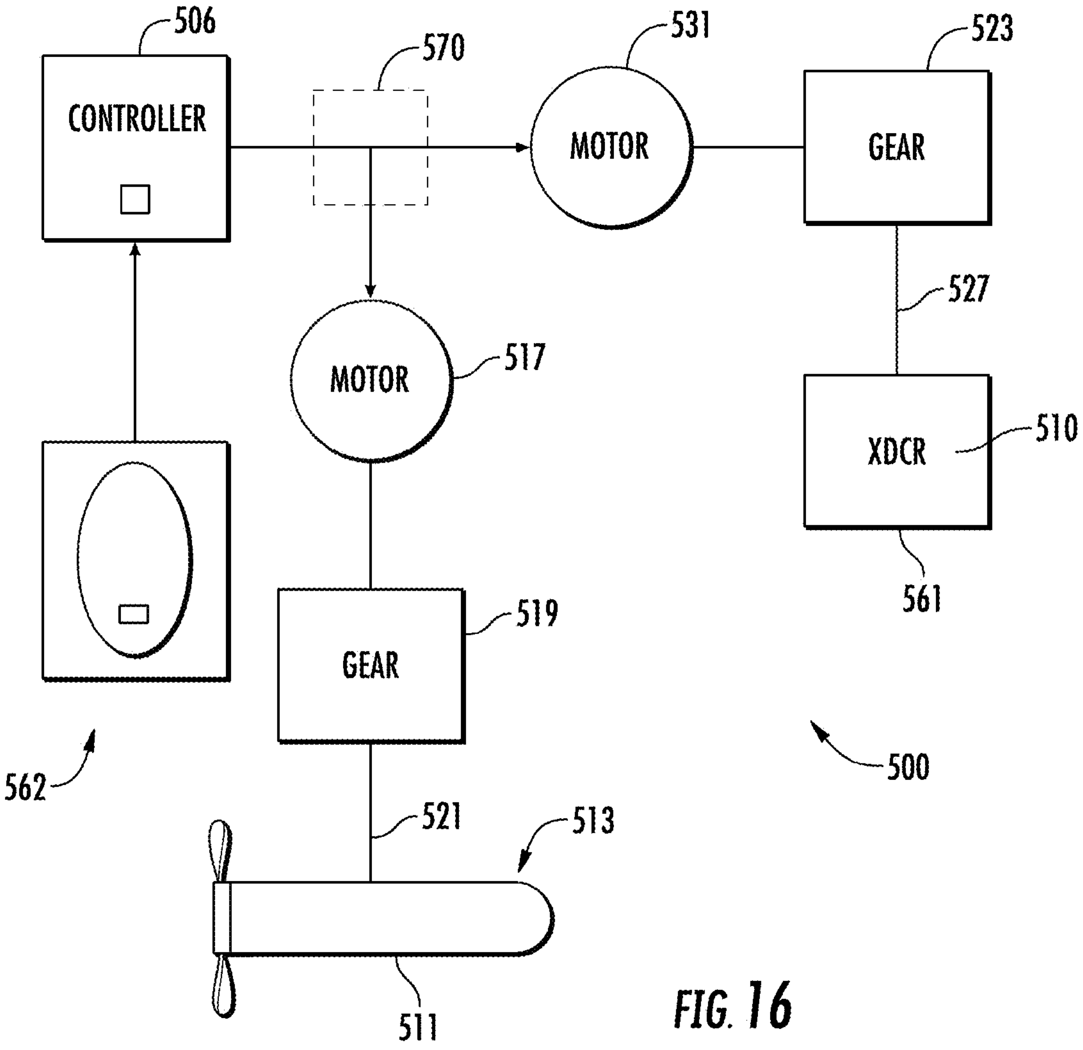
FIG. 16 is a block diagram illustrating a dual motor embodiment of the present invention that has the sonar array mounted remote from the trolling motor propulsion unit.
Figure 17:
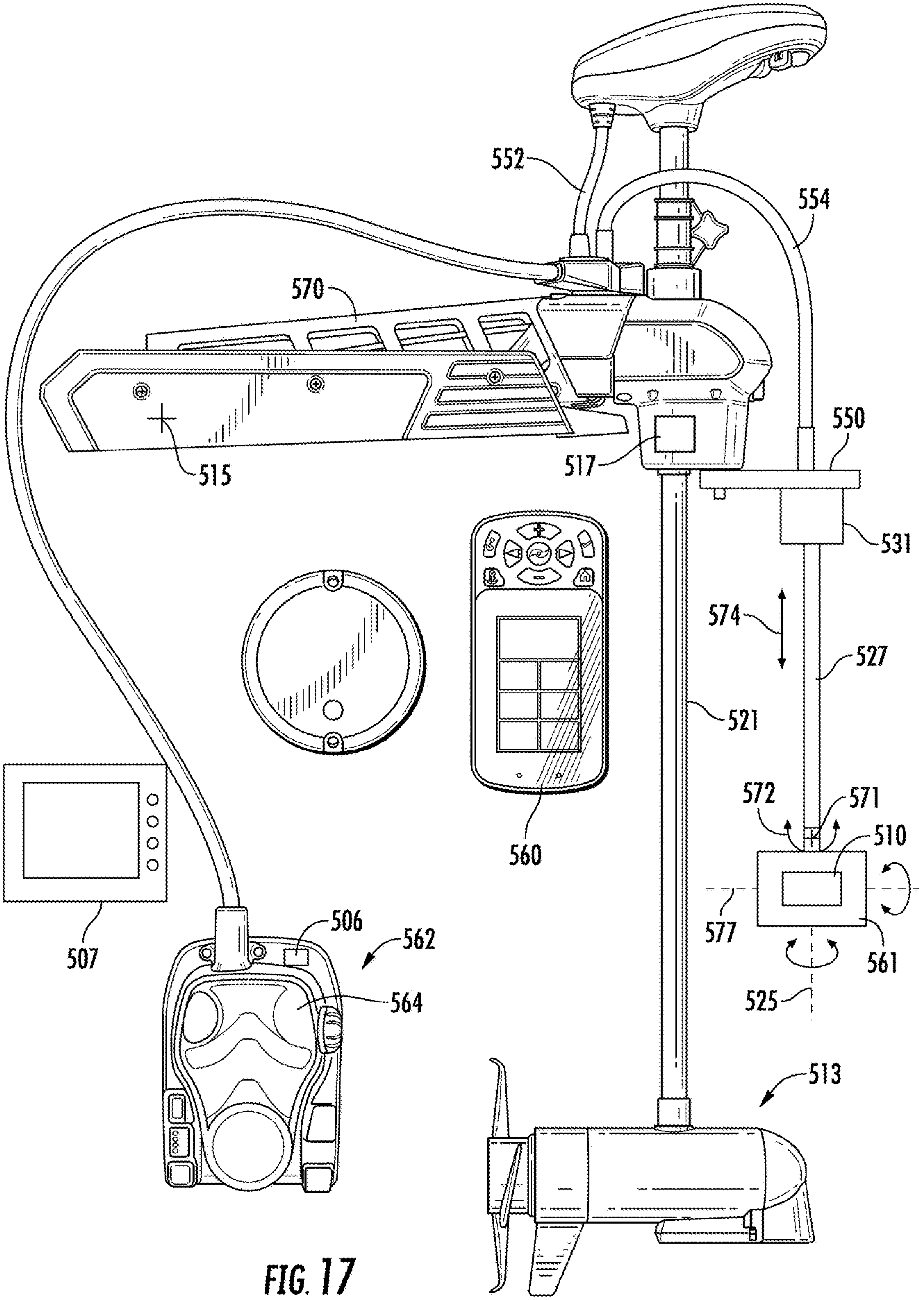
FIG. 17 is a representative implementation of the block diagram of FIG. 16.

With reference to FIGS. 16 and 17, an embodiment of a sonar positioning system 500 of the present invention is illustrated. This embodiment utilizes two motors 517, 531 and, optional, respective gear trains 519, 523 to control of the orientation of the propulsion unit 513 and the sonar array 510.

In one embodiment, the propulsion unit 513 is mounted to a first shaft 521 and the sonar array 510 is mounted to a second shaft 527. The sonar array 510 is located within its own housing 561 that is wholly independent of the propulsion unit 513 rather than having the sonar array located within the propulsion unit housing such as in various ones of the previously discussed embodiments. As such, in this embodiment, when the motor 517 changes the orientation of the propulsion unit 513 relative to the boat, the sonar array 510 and the housing 561 are not also moved relative to the boat. Instead, motor 531 must be energized to change the orientation of the sonar array 510 relative to the boat.

In this embodiment, a deployment mechanism 570 may be used to mount the motors 517, 531, gear trains 517, 523, mounting shafts 521, 527, the propulsion unit 513 and the sonar array 510 to the boat. The deployment mechanism 570 can be used to simultaneously or sequentially deploy and/or stow the propulsion unit 513 and sonar array 510 relative to the boat.

FIG. 17 illustrates a more detailed implementation of the block diagram of FIG. 16. Deployment mechanism 570 operably attaches the rest of the components of the system to a boat. The deployment mechanism 570 can be pivoted about axis 515 between a deployed state (illustrated in FIG. 17) and a stowed state (not shown).

Here, the propulsion unit 513 is carried by shaft 521, which is driven relative to the deployment mechanism 570 (and thus the boat) by motor 517. The sonar array 510 and associated housing 561 is carried by shaft 527, which is driven relative to the deployment mechanism 570 (and thus the boat) by motor 531. A mounting bracket 550 connects motor 531, shaft 527, sonar array 510 and housing 561 to the rest of the deployment mechanism 570.

In this example, controller 506 is operably coupled to motors 517 and 531 by way of cables 552, 554. Controller 506 is located within foot control 562 that has foot pedal 564. In this example, foot control 562 can be configured to control steering of both the propulsion unit 513 and the steering of sonar array 510.

In one example, the user may toggle the foot control 562 between modes for controlling, by pressing pedal 564, the steering of only the propulsion unit 513, only the sonar array 510 or both the sonar array 510 and the propulsion unit 513. In one mode, when the foot control 562 steers both the propulsion unit 513 and the sonar array 510, the sonar array and the propulsion unit are steered to point in the same general direction within the real world coordinate system.

Notably, in addition to steering using pedal 564, in some embodiments, fish finder 507 or remote control 560 (both in FIG. 17) can be used to control steering or provide steering inputs for only the propulsion unit 513, only the sonar array 510 or both the sonar array 510 and the propulsion unit 513. Further yet, in some embodiments, the foot control 562 could have multiple input devices for providing user inputs for steering the propulsion unit 513 independent of user inputs for steering the sonar array 510. Alternatively, a switch or other device can be used to switch between the different modes outlined above.

In one mode, the controller 506 may steer the propulsion unit 513 using SpotLock technology to hold the watercraft at a desired location and the controller 506 may steer the sonar array 510 to be aimed at a desired target. In yet another mode, the controller 506 may steer the propulsion unit 513 using SpotLock technology to hold the watercraft at a desired location and the foot control 562 and particularly the pedal 564 may be used by the user to steer the sonar array 510 without affecting the SpotLock control of the propulsion unit. Once a desired target is identified by the user by steering the sonar array 510, the user can cause the controller 506 to automatically steer the sonar array 510 to remain aimed at the target, such as due to rotating action of the boat even while using SpotLock. For example, once the target is identified and/or selected, the user could press a but to initiate the automatic steering of the sonar array 510. Thus, in this situation, the controller 506 would steer the propulsion unit 513 using SpotLock features and automatically steer the sonar array 510 to keep it aimed at the desired target (or in a desired orientation relative to the boat or the real world coordinate system).

In some embodiments, separate steering input devices may be provided. For example, two separate foot controls could be provided, two separate remotes could be provided. A combination of a foot control and a remote could be provided.

The counter steering capabilities outlined above, such as for systems 300 and 400 can be employed in system 500. For example, if a user steers the trolling motor in one direction, the system can automatically limit the rotation of the sonar array in the same direction or being to rotate the sonar array 510 in the opposite direction. Further yet, in some embodiments upon movement of the boat within the real world coordinate system, the system can automatically turn the sonar array 510 to maintain it pointing at a desired target or in a desired orientation within the real world coordinate system.

While a single controller 506 is illustrated in FIGS. 16 and 17, in other embodiments, wholly separate controllers can be used with one controller for each of the motors 517, 531, similar to the arrangement of FIG. 14, but with the sonar array mounted as in FIG. 17 as opposed to having the sonar array located within the housing of the propulsion unit as illustrated in FIG. 14.

In one implementation, a user may steer, using the foot control 562, the sonar array 510 to point the sonar array in a desired orientation or at a desired target, with or without steering the propulsion unit. The user may then transition to a propulsion unit 513 only mode where the foot control 562 will only steer the propulsion unit 513. In this mode, the user can set the system to maintain the sonar array 510 pointed in the desired orientation (e.g. a constant bearing within the coordinate system of the body of water or at a constant orientation relative to the boat) or set the system to maintain the sonar array 510 pointed at a desired structure within the body of water.

Further yet, in some embodiments, the user can set the system to track a target that is moving within the body of water. The user can identify the movable target and initially point the sonar array 510 at the movable target or the system can operate in an automatic mode where it identifies a moving target within the body of water and prompts the user to determine whether the target should be tracked. The tracking can include maintaining the sonar array 510 aimed at the target, steering the propulsion unit 513 toward the target or both maintaining the sonar array 510 aimed at the target and steering the propulsion unit toward the target.

The systems outlined above can provide steering of the sonar array in three dimensions, e.g. both horizontal and vertical control. For instance and with reference to FIG. 17, the system can be configured to pivot the sonar array 510 about axis 571 as illustrated by the arrow 572 as well as to drive shaft 527 vertically relative to mounting bracket 550 (or deployment mechanism 570) as illustrated by arrow 574. This can be done by additional motors that are operably coupled to or work with controller 506. Further yet, the sonar array 510 could be pivoted about a third axis 577 that is perpendicular to axis 525 and axis 571. By providing control about axes 525, 571, 577 and linear vertical positioning along axis 525 (illustrated by arrow 574), a randomly moving target within the body of water can more accurately and precisely be tracked by the sonar array 510.

In some embodiments, separate mechanisms for mounting the propulsion unit 513 and the sonar array 510 to a boat may be employed. For example, a system could employ the combination of the trolling motor of FIG. 3 and a system of FIG. 9.

Again, IMU, GPS, heading, dead reckoning data and information can be used by the controller 506 or controllers to orient the sonar array 510 pointing at a desired target or in a desired orientation relative to the world coordinates.

All references, including publications, patent applications, and patents cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) is to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sonar positioning system for positioning a sonar array comprising:

a steerable mounting mechanism steerable about a first axis, the steerable mounting mechanism including a propulsion unit of a trolling motor and a first motor for steering the propulsion unit relative to the first axis;

a sonar array; and a sonar steering mechanism interposed between the sonar array and the steerable mounting mechanism, the sonar steering mechanism including a counter steering mechanism configured to counter and/or compensate for movement of the sonar array due to steering movement of the propulsion unit, the counter steering mechanism including a second motor for steering the sonar array relative to the propulsion unit.

2. The sonar positioning system of claim 1, wherein:

the sonar array is attached to the steerable mounting mechanism such that operation of the first motor to steer the propulsion unit moves the sonar array;

the first motor rotatably steers the propulsion unit about the first axis; and the second motor rotatably steers the sonar array relative to the propulsion unit.

3. The sonar positioning system of claim 2, further comprising at least one controller coupled to the first and second motors for driving the first and second motors; and wherein the at least one controller is configured to drive the second motor in an opposite direction or at a reduced rate as the first motor to counter rotation or limit rotation of the sonar array due to steering of the propulsion unit by the first motor.

4. The sonar positioning system of claim 3, wherein the at least one controller has a lockout mode wherein the at least one controller does not drive the second motor when the first motor is being driven to steer the propulsion unit such that the sonar array is rotated with the propulsion unit when the first motor steers the propulsion unit about the first axis.

5. The sonar positioning system of claim 2, further comprising at least one controller coupled to the first and second motors for driving the first and second motors; and wherein the at least one controller includes a first controller and a second controller, the first controller operably controls the first motor and rotation of the propulsion unit about the first axis and the second controller controls the second motor and rotation of the sonar array relative to the propulsion unit.

6. The sonar positioning system of claim 2, further comprising at least one controller coupled to the first and second motors for driving the first and second motors; and wherein the at least one controller is configured to maintain the sonar array at a constant orientation relative to the outside world regardless of rotational motion of the steerable mounting mechanism relative to the outside world.

7. The sonar positioning system of claim 1, wherein:

the steerable mounting mechanism includes a mount for mounting to a watercraft, the steerable mounting mechanism rotatable relative to the mount about the first axis; and the sonar steering mechanism rotates the sonar array relative to the mount.

8. A system for positioning a sonar array comprising:

a sonar array;

a first motor operably connected to the sonar array and configured to steer the sonar array;

a propulsion unit for a trolling motor;

a second motor operably connected to the propulsion unit configured to steer the propulsion unit;

at least one controller connected to the first and second motors to provide control signals to the first and second motors;

a first input device connected to the at least one controller to provide user generated steering inputs;

wherein:

the at least one controller is configured to switch between a first mode and a second mode;

when in the first mode, the at least one controller only generates control signals for the first motor based on the user generated steering inputs generated by the first input device; and when in the second mode, the at least one controller only generates control signals for the second motor based on the user generated steering inputs generated by the first input device.

9. The system of claim 8, wherein the first input device includes a foot control.

10. The system of claim 8, wherein the at least one controller is configured to switch between the first and second modes as well as a third mode, when in the third mode, the at least one controller generates control signals for both the first and second motors based on the user generated steering inputs generated by the first input device.

11. The system of claim 10, wherein, when in the third mode, the foot control provides steering inputs to aim the propulsion unit and the sonar array in the same direction.

12. The system of claim 10, wherein, when in the third mode, the first input device provides steering inputs for both the first and second motors simultaneously.

13. The system of claim 8, wherein, when in the third mode, the at least one controller is configured to steer the sonar array in an opposite direction as the propulsion unit and/or at a different angular rate.

14. The system of claim 8, wherein steering of the propulsion unit does not mechanically steer the sonar array and steering of the sonar array does not mechanically steer the propulsion unit.

15. The system of claim 8, further comprising a deployment arrangement configured to be mounted to a boat and transitioned between a deployed state and a stowed state; and wherein the first and second motors, the propulsion unit, and the sonar array are all attached to the deployment arrangement for transitioning between the deployed state and stowed state with the deployment arrangement.

16. The system of claim 15, wherein:

the first motor rotates the sonar array relative to the deployment arrangement about a first axis; and the second motor rotates the propulsion unit relative to the deployment arrangement about a second axis, the second axis being different than the first axis.

17. The system of claim 8, wherein the at least one controller is configured to steer the sonar array to maintain the sonar array pointed at a desired target within a body of water regardless of steering of the propulsion unit.

18. The system of claim 8, wherein:

the at least one controller is configured to use signals from the sonar array to identify an identified target within a body of water in which the sonar array is located; and the at least one controller is configured to prompt a user whether to steer the sonar array to maintain the sonar array aimed at the identified target.

19. A method of positioning a sonar array comprising:

when operating in a first mode:

receiving user generated steering inputs generated from a first input device;

using the user generated steering inputs generated from the first input device to steer only a sonar array by operably controlling a first motor operably coupled to the sonar array based on the user generated steering inputs from the first input device; and when operating in a second mode:

receiving user generated steering inputs generated from the first input device;

using the user generated steering inputs generated from the first input device to steer only a propulsion unit by operably controlling a second motor operably coupled to the sonar array based on the user generated steering inputs from the first input device.

20. The method of claim 19, wherein when operating in a third mode:

using a same user generated steering input to control both the first and second motors and to steer both the sonar array and the propulsion unit.

21. The method of claim 19, further including:

when in the second mode, steering the sonar array with a controller independent of the user generated steering inputs to maintain the sonar array pointed at a desired target within a body of water or in a desired orientation relative to a real world coordinate system.

* * * * *